United States Patent
Stapleton

(10) Patent No.: US 12,231,416 B1
(45) Date of Patent: Feb. 18, 2025

(54) SYSTEMS AND METHODS FOR MULTI-FACTOR DEVICE AUTHENTICATION USING QUANTUM ENTANGLED PARTICLES

(71) Applicant: Wells Fargo Bank, N.A., San Francisco, CA (US)

(72) Inventor: Jeff J. Stapleton, O'Fallon, MO (US)

(73) Assignee: Wells Fargo Bank, N.A., San Francisco, CA (US)

(*) Notice: Subject to any disclaimer, the term of this patent is extended or adjusted under 35 U.S.C. 154(b) by 268 days.

(21) Appl. No.: 18/062,537

(22) Filed: Dec. 6, 2022

(51) Int. Cl.
*H04L 9/40* (2022.01)
*H04L 9/08* (2006.01)

(52) U.S. Cl.
CPC ............ *H04L 63/08* (2013.01); *H04L 9/0852* (2013.01); *H04L 2463/082* (2013.01)

(58) Field of Classification Search
CPC .. H04L 63/08; H04L 9/0852; H04L 2463/082
See application file for complete search history.

(56) References Cited

U.S. PATENT DOCUMENTS

| | | | |
|---|---|---|---|
| 9,887,976 B2 | 2/2018 | Hughes et al. | |
| 10,382,198 B2* | 8/2019 | Choi | H04L 9/0861 |
| 2009/0060185 A1* | 3/2009 | Tresser | H04L 9/3247 |
| | | | 380/255 |
| 2015/0222619 A1* | 8/2015 | Hughes | H04L 9/0852 |
| | | | 713/168 |
| 2020/0274701 A1 | 8/2020 | Yan et al. | |
| 2020/0403787 A1* | 12/2020 | Islam | H04L 9/0852 |
| 2024/0097890 A1* | 3/2024 | Goh | G06F 7/588 |

OTHER PUBLICATIONS

Hazel Murray and David Malon, Quantum Multi-Factor Authentication, Oct. 11, 2021.
Sareh Assiri, Key Exchange using Ternary System to Enhance Security, Mohammad Mohammadinodoushan School of Informatic, Computing, and Cyber Systems Northern Arizona University, Flagstaff, AZ, Feb. 10, 2021.

(Continued)

*Primary Examiner* — Henry Tsang
(74) *Attorney, Agent, or Firm* — K&L Gates LLP

(57) ABSTRACT

Systems, apparatuses, methods, and computer program products are disclosed for authentication of devices. An example method includes an authentication technique utilizing multiple authentication factors. The first authentication factor includes obtaining identical quantum entangled particles by a first device and a second device. The first and second device may read the quantum entangled particles to obtain identical bit sequences associated with the quantum entangled particles. The first and second device may utilize the bit sequences, along with a second factor, to authenticate a connection between the devices. The second factor may be, for example, a user password. The first device may send a request for authentication including one of the bit sequences and an encrypted version of the user's password. The second device may authenticate the first device using an identical copy of the bit sequence and previously obtained knowledge of the user's password.

20 Claims, 10 Drawing Sheets

(56) References Cited

OTHER PUBLICATIONS

Artur K. Ekert, Quantum Cryptography Based on Bell Theorem, Physical Review Letters, vol. 67, No. 6, Aug. 5, 1991.
Charles H. Bennett & Giles Brassard, Quantum Cryptography: Public Key Distribution and Coin Tossing, International Conference on Computers, Systems & Signal Processing, Bangalore, India, vol. 1, Dec. 9-12, 1984.
Secure Hash Standard (SHS), FIPS PUB 180-4, Aug. 2015.
Digital Signature Standard (DSS) FIPS PUB 186-5, Feb. 3, 2023.
The Keyed-Hash Message Authentication Code (HMAC), FIPS PUB 198-1, Jul. 2008.
K. Moriarty, et al., Password-Based Cryptography Specification, Version 2.1, Internet Engineering Task Force (IETF), ISSN: 2070-1721, Jan. 2017.

* cited by examiner

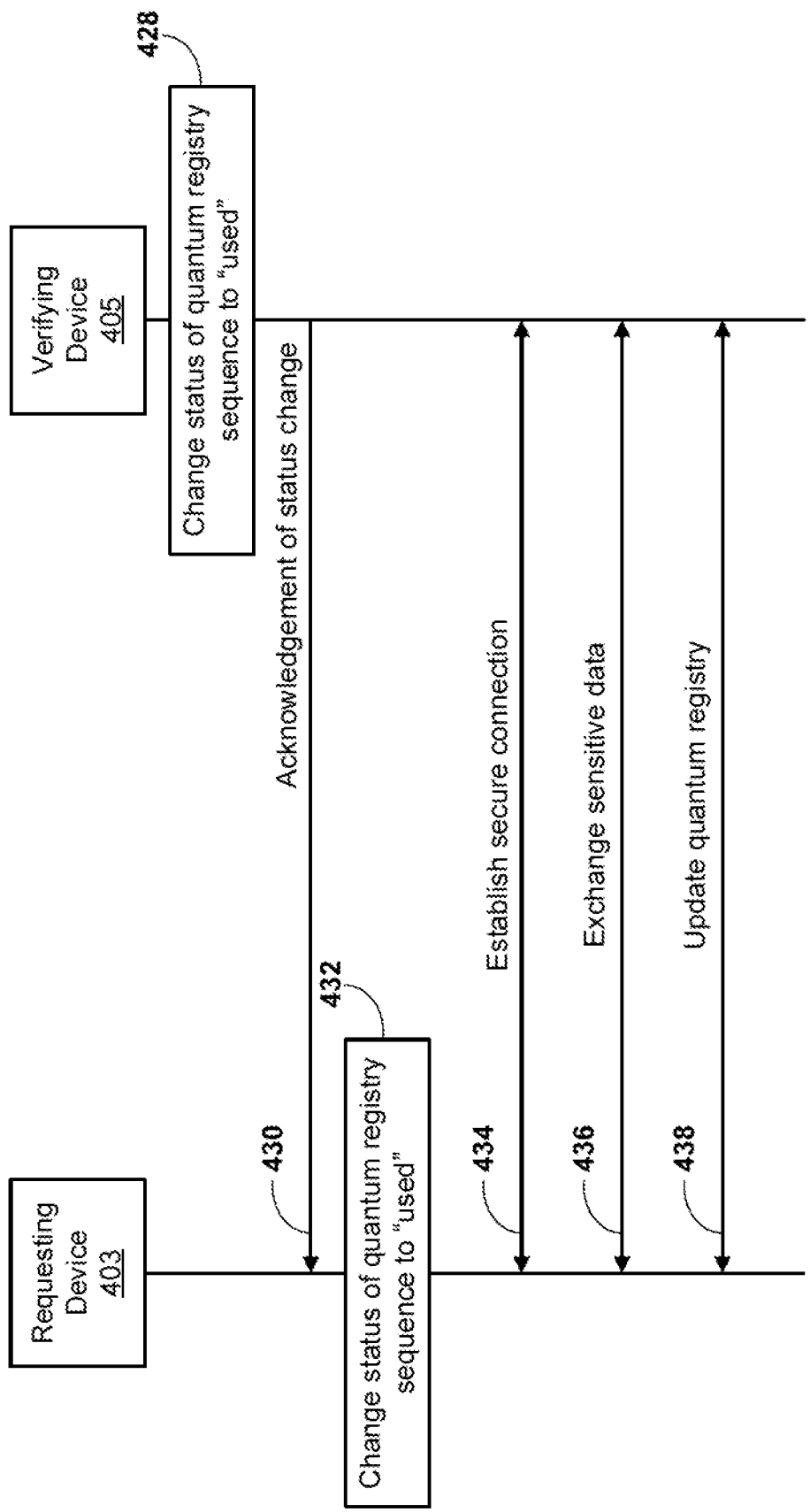

SYSTEMS AND METHODS FOR MULTI-FACTOR DEVICE AUTHENTICATION USING QUANTUM ENTANGLED PARTICLES

BACKGROUND

Modern systems may facilitate communication between parties at various physical locations out of eyesight of one another. Such systems may be highly distributed with various components being located substantial distances from one another. The distances between these components and the manner of operation of the components may allow for third parties to gain access to communications between parties over these systems.

BRIEF SUMMARY

Communication systems facilitate a broad array of interactions between computer systems and users thereof. As part of these interactions, the computer systems may send and receive sensitive information. Due to the value of the sensitive information, third parties may attempt to intercept or modify sensitive information or masquerade as a legitimate party.

These third parties may use a range of methods of obtaining copies of sensitive information that exploit the operation of communications systems. For example, the third parties may impersonate actors in the system to convince other actors (e.g., those authorized to send and access sensitive information) to send copies of sensitive information to the third parties. In another example, third parties may attempt to modify data-in-transit or data-at-rest.

To reduce the likelihood of the sensitive information being obtained by unintended recipients (e.g., third parties), the devices throughout a distributed system may perform one or more identity verification, authentication, communication security, and/or other protective actions. Systems, apparatuses, methods, and computer program products are disclosed herein for authenticating devices and users thereof using multiple authentication factors in a distributed system. By performing protective actions using multiple authentication factors, unintended recipients may be less likely to obtain sensitive information via the methods described above.

To authenticate devices and users thereof, a system may utilize a first authentication factor which may include bit sequences obtained via distribution of pairs of quantum entangled particles via transmission mediums (e.g., fiber optics, etc.) to devices for authentication. The system may distribute one quantum entangled particle of each pair (or triplet or high numbers) of quantum entangled particles to a device (e.g., a requesting device) seeking to secure communications with a second device (e.g., a verifying device), or multiple devices. These devices may read (e.g., interpret) the quantum entangled particles in order to obtain the bit sequences associated with the quantum entangled particles. By doing so, the requesting device and verifying device may have access to identical bit sequences and may use these respective bit sequences to, for example, authenticate (at least in part) each other, secure communications between each other, and/or otherwise reduce the likelihood of transmitting sensitive information to unintended recipients.

In order to further secure communications and to verify the identity of a user of a device, an authentication process performed by the system between a requesting device and a verifying device may include a second authentication factor. The second authentication factor may include a user authentication factor (e.g., a password, a biometric sample, a one-time-passcode (OTP) or the like), provided by the user of the requesting device. The second authentication factor may be encrypted and used in conjunction with the first authentication factor (e.g., the bit sequences) to establish a secure connection between devices in a distributed system. The user authentication factor may include different/other information used to verify the identity of a user (e.g., a pin, a fingerprint, an iris print, a voice print, etc.) without departing from embodiments disclosed herein.

In one example embodiment, a method is provided for authentication between a requesting device and a verifying device operably connected to each other with a communications network and quantum distribution medium used to transmit data between the requesting device and the verifying device. The method may include receiving, by communication hardware of the requesting device, a user authentication factor for a user initiating a request. The method may also include generating, by a transformation engine of the requesting device, a request data item using a function operating on a set of request components, the set of request components including (i) a quantum registry sequence obtained via the quantum distribution medium and with one or more quantum entangled particles distributed to the requesting device thereby, (ii) an index that references the quantum registry sequence in a quantum registry, (iii) a timestamp for the request, and (iv) a user authentication factor for the user initiating the request. The method may also include encrypting, by encryption circuitry of the requesting device, the user authentication factor to produce an encrypted user authentication factor. The method may also include obtaining the request by request generation circuitry of the requesting device, the request including the encrypted user authentication factor, the timestamp, the index, and the request data item. The method may also include transmitting, by the communication hardware and via the communications network, the request to the verifying device. The method may also include obtaining, by the communication hardware, an authentication acknowledgement from the verifying device, the authentication acknowledgement indicating that the verifying device has determined that the quantum registry sequence matches a copy of the quantum registry sequence obtained by the verifying device via the quantum distribution medium. The method may also include obtaining, by the communication hardware, a second authentication acknowledgement from the verifying device, the second authentication acknowledgement indicating that the verifying device has verified, based on the encrypted user authentication factor in the request, that the user initiated the request.

Prior to obtaining the request data item, the requesting device may perform several actions. First, the communication hardware of the requesting device may obtain the one or more quantum entangled particles from a quantum entangled particle generator via the quantum distribution medium. Second, a quantum entangled particle reader of the requesting device may obtain the quantum registry sequence, the quantum registry sequence being a bit sequence. Third, the quantum entangled particle reader may store the quantum registry sequence in the quantum registry, the quantum registry comprising: one or more quantum registry sequences, a respective index for each quantum registry sequence of the one or more quantum registry sequences, and a status for each of the one or more quantum registry sequences. While described sequentially, these actions may be performed in any order prior to obtaining the request data item.

The status for each of the one or more quantum registry sequences may be unused, in-use, or used.

In order to obtain the request data item, the requesting device may select an unused quantum registry sequence. In order to do so, the requesting device may identify a set of the quantum registry sequences from the quantum registry that each have a status of being unused and select the quantum registry sequence from the set of quantum registry sequences.

After selecting the quantum registry sequence, the request generation circuitry of the requesting device may update the status of the quantum registry sequence to in-use to obtain an updated status. An in-use status may indicate that the quantum registry sequence is not available for selection by the requesting device and is in-use for an authentication process.

After obtaining the second authentication acknowledgement, the request generation circuitry may modify the updated status of the quantum registry sequence to used, wherein a used status indicates that the quantum registry sequence is not available for selection by the requesting device and not usable for any authentication processes.

The request generation circuitry of the requesting device may update the quantum registry wherein updating the quantum registry may include obtaining one or more new quantum registry sequences via the quantum distribution medium, and storing the one or more new quantum registry sequences in the quantum registry.

Prior to transmitting a request for access to the verifying device, the requesting device may encrypt a user authentication factor inputted by a user. The encrypted user authentication factor may be encrypted using either an encryption method previously agreed upon by the requesting device and the verifying device or an encryption method identified by the requesting device in the request to the verifying device.

In order to authenticate the encrypted user authentication factor transmitted by the requesting device, the verifying device may encode (e.g., using a one-way function, a digital signature, a time stamp token, or the like) the user authentication factor (following decryption using one of the previously described methods). The verifying device may compare the encoded decrypted user authentication factor to a copy of the encoded user authentication factor stored by the verifying device. In order to do so, the communication hardware of the requesting device may distribute a copy of the encoded user authentication factor to the verifying device, the encrypted user authentication factor being usable in conjunction with the encoded user authentication factor to verify that the user initiated the request.

The communication hardware of the requesting device may establish a secure communication channel between the requesting device and the verifying device using a second quantum registry sequence of the quantum registry. In addition, the communication hardware may receive sensitive information from the verifying device via the secure communication channel, wherein the sensitive information is responsive to the request.

In another example embodiment, a requesting device is provided. The requesting device includes communication hardware configured to receive a user authentication factor for a user initiating a request. The requesting device also includes a transformation engine configured to generate a request data item using a function operating on a set of request components, the set of request components comprising (i) a quantum registry sequence obtained via a quantum distribution medium and with one or more quantum entangled particles distributed to the requesting device thereby, (ii) an index that references the quantum registry sequence in a quantum registry, (iii) a timestamp for the request, and (iv) a user authentication factor of a user initiating the request. The requesting device also includes encryption circuitry configured to encrypt the user authentication factor to produce an encrypted user authentication factor. The requesting device also includes request generation circuitry configured to obtain the request, the request comprising the encrypted user authentication factor, the timestamp, the index, and the request data item. The requesting device also includes communication hardware further configured to transmit the request to a verifying device via a communications network. The requesting device also includes communication hardware further configured to obtain an authentication acknowledgement from the verifying device, the authentication acknowledgement indicating that the verifying device has determined that the quantum registry sequence matches a copy of the quantum registry sequence obtained by the verifying device via the quantum distribution medium. The requesting device also includes communication hardware further configured to obtain a second authentication acknowledgement from the verifying device, the second authentication acknowledgement indicating that the verifying device has verified, based on the encrypted user authentication factor in the request, that the user initiated the request.

The foregoing brief summary is provided merely for purposes of summarizing some embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain embodiments in general terms above, reference will now be made to the accompanying drawings, which are not necessarily drawn to scale. Some embodiments may include fewer or more components than those shown in the figures.

FIGS. 4A-4C illustrates example operations of a system, in accordance with some embodiments described herein.

DETAILED DESCRIPTION

Figure 1:
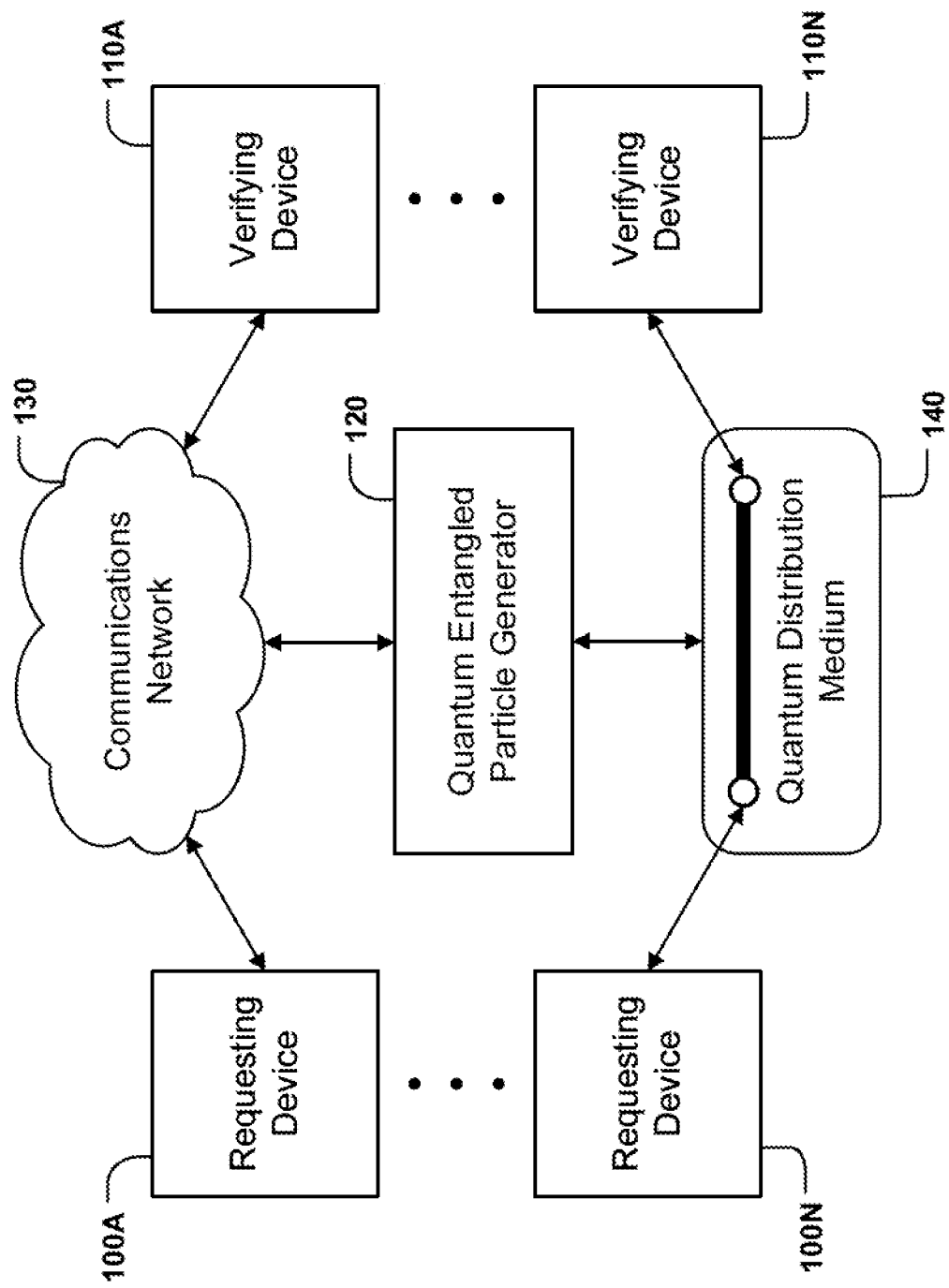
FIG. 1 illustrates a system in which some embodiments may be used for authenticating devices and/or users thereof.

Some embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, embodiments described herein provide methods, apparatuses, systems, and computer program products for authentication of devices and users thereof in a distributed system. The distributed system may allow the devices and users to provide and obtain various services including, for example, data distribution and/or other types of computer-implemented services. As part of these services, sensitive information may be distributed within the distributed system.

Authentication of devices in distributed systems may be challenging due to the distance between the devices and the complexity of the environment in which the devices reside. Authentication of devices utilizing a single authentication factor (e.g., a password) may be vulnerable to third-party interference, as a third party may be able to, for example, discover a password and masquerade as a legitimate party. By doing so, sensitive information may be distributed to unintended recipients in these distributed systems.

To reduce the likelihood of sensitive information being distributed to unintended recipients, embodiments may provide for multi-factor device authentication. By using multiple authentication factors from devices and users thereof, third parties may be less likely to successfully interfere in communications between devices and obtain sensitive information.

For example, a first authentication factor may utilize quantum entangled particles. The disclosed embodiments may facilitate distribution of quantum entangled particles to devices (e.g., to-be-authenticated devices) prior to distribution of sensitive information between the devices. The devices that receive the quantum entangled particles may use the quantum entangled particles to obtain bit sequences known to the devices attempting to authenticate them.

The use of quantum entangled particles as an authentication factor may allow for confirmation that two (or more) devices may have access to identical bit sequences obtained from quantum entangled particles. However, a second authentication factor may further improve device authentication within distributed systems by confirming the identity of users of devices that have access to the quantum entangled particles. The second factor may include a user authentication factor (e.g., a password, a biometric factor, a one-time-passcode (OTP), or the like) provided by the user of the device. The combination of the first authentication factor (e.g., the quantum entangled particles) and the second authentication factor (e.g., the user authentication factor) may provide a multi-factor approach to device authentication. The user authentication factor may include different/ other information used to verify the identity of a user such as a pin, a fingerprint, an iris print, a voice print, etc. without departing from embodiments disclosed herein.

Following authentication of the two devices using the first authentication factor and the second authentication factor, a secure connection may be established and sensitive information may be exchanged. In addition to being usable for authentication, the bit sequences obtained from the quantum entangled particles may also be utilized for communication security. For example, the bit sequences may be utilized to obtain symmetric keys, may be used as one time pads, and/or may be otherwise used to secure the exchange of sensitive information between devices in the distributed system after the devices participating in the exchange have been authenticated.

Although a high level explanation of the operations of embodiments has been provided above, specific details regarding the configuration of such embodiments are provided below.

System Architecture

Embodiments described herein may be implemented using any number and type of computing devices. To this end, FIG. 1 illustrates an example environment within which various embodiments may operate. As illustrated, the environment may include any number of requesting devices 100A-100N and verifying devices 110A-110N. These devices may interact with one another to perform any number and types of services. When performing the services, the devices may exchange sensitive information. However, prior to exchanging sensitive information, the devices may facilitate authentication of one another using quantum entangled particles previously known by the devices and a user authentication factor associated with a user of a device. Additionally, prior to the transmission of sensitive information, the sensitive information may be encrypted and/or otherwise processed to conceal its content.

As used herein, the term requesting device refers to a device that is requesting authentication by another device (e.g., a verifying device). Likewise, the term verifying device refers to a device that is verifying the authentication requested by another device. Any device may be a requesting device and/or a verifying device (for example, a device may both be in the process of authenticating another device while also being authenticated by a different device) depending on their role, which may change over time.

Returning to the discussion of the services provided by these device, these devices may authenticate one or more devices participating in the services, secure communications between these devices, and/or perform other protective actions to reduce the likelihood of unintended actors participating in and/or receiving the services. As part of performing the services, any of the devices may transmit sensitive information to one another. By authenticating, securing communications, and/or performing other protective actions, these devices may reduce the likelihood of sensitive information being distributed to unintended recipients.

The requesting devices 100A-100N may be implemented using any number (one, many, etc.) and types of computing devices known in the art, such as desktop or laptop computers, tablet devices, smartphones, or the like. The requesting devices may be associated with corresponding users (e.g., administrators, customers, representatives, other persons, etc.) that use the requesting devices 100A-100N to interact with one or more verifying devices 110A-110N.

The users and/or applications hosted by the requesting devices may transmit sensitive information to and/or receive sensitive information from the verifying devices 110A-110N when interacting with them (and/or other devices). The sensitive information may include, for example, financial information, future plans, personal information, and/or other types of information that may be exploited by unintended recipients of the sensitive information. The unintended recipients may obtain the sensitive information by inadvertent transmission by the requesting devices or through intentional action by the unintended recipients to obtain the sensitive information. To reduce the likelihood of the sensitive information being obtained by unintended recipients, the requesting devices may perform one or more protective actions such as, for example, identity verification, authentication, communication security, and/or other actions as part of or with the services provided by the requesting devices 100A-100N and verifying devices 110A-110N.

The verifying devices 110A-110N may be implemented using any number and types of computing devices known in the art, such as desktop or laptop computers, tablet devices, smartphones, or the like. The verifying devices 110A-110N may provide computer-implemented services to and/or receive computer-implemented services from the requesting devices 100A-100N and/or other devices.

Like the requesting devices 100A-100N, the verifying devices 110A-110N may be associated with corresponding users (e.g., administrators, customers, representatives, other persons, etc.) that use the verifying devices 110A-110N to interact with one or more of the requesting devices 100A-100N (and/or other devices). The users and/or applications hosted by the verifying devices may transmit and/or receive sensitive information to or from the requesting devices 100A-100N when interacting with them (and/or other devices). To reduce the likelihood of sensitive information being distributed to unintended recipients, the verifying devices may perform one or more protective actions such as, for example, identity verification, authentication, communication security, and/or other actions as part of or with the services provided by the verifying devices 110A-110N.

The requesting devices 100A-100N and the verifying devices 110A-110N may cooperatively provide various computer-implemented services to accomplish desirable goals for their respective users. For example, consider a scenario in which a requesting device is being used by a banking client to communicate with a bank that uses a verifying device. The banking client may desire access to financial information provided by the bank. To do so, the banking client may input a password (e.g., a user authentication factor). However, the bank may not be able to rely on the password to sufficiently identify and/or authenticate the banking client. For example, passwords may be intercepted and used by third parties to try to gain access to financial information provided by the bank.

To reduce the likelihood of unintended recipients obtaining information transmitted between requesting devices and verifying devices, embodiments disclosed herein may provide for the performance of protective actions using at least two authentication factors. The two authentication factors may be quantum entangled particles and a user authentication factor (e.g., a password, a biometric factor, a one-time-passcode (OTP), or the like) associated with a user. For example, the requesting device may establish a secure communication channel to the verifying device using the two authentication factors to reduce the likelihood of unintended recipients gaining access to the financial information.

The quantum entangled particles may be used as an authentication factor via quantum key distribution. Quantum key distribution may allow for establishment of a shared secret between two devices (e.g., requesting and verifying devices). To perform the protective actions, in one or more embodiments, all or a portion of the requesting devices 100A-100N and the verifying devices 110A-110N may include specialized hardware for "reading" (e.g., interpreting) quantum entangled particles. By reading the quantum entangled particles, the entanglement may be collapsed and bit sequences may be obtained by pairs of verifying and requesting devices reading the quantum entangled particles. The bit sequences may be usable, for example, to perform symmetric encryption for communication, device/user authentication, and/or other protective actions.

In an embodiment, the system of FIG. 1 includes a quantum entangled particle generator 120. The quantum entangled particle generator 120 may generate pairs of quantum entangled particles. One quantum entangled particle of each pair of quantum entangled particles may be distributed to a requesting device and the other quantum entangled particle of each pair may be distributed to a verifying device via the quantum distribution medium 140. Upon receiving the quantum entangled particles, both the requesting and verifying device may "read" (e.g., interpret) the quantum entangled particles and obtain identical bit sequences. Consequently, both the requesting and verifying device may have access to the shared secret (e.g., the bit sequence) without transmitting the shared secret between the devices.

To facilitate communications, any of the devices shown in FIG. 1 may be operably connected to each other with communications network 130 and/or quantum distribution medium 140. Communications network 130 and/or quantum distribution medium 140 may facilitate communications with one or more wired and/or wireless networks implemented using any suitable communications technology. In one embodiment, communications network 130 and/or quantum distribution medium 140 may include any number and type of transmission mediums (e.g., electrical cabling, optical cabling, free space channels, etc.) through which signals (e.g., electrical, optical, etc.) on which data is encoded may be distributed amongst the devices. The communications network 130 and/or quantum distribution medium 140 may be implemented using any number and types of communication protocols.

In an embodiment, quantum entangled particles may be injected locally into devices (e.g., requesting devices, verifying devices, etc.) at a secure facility (e.g., a quantum injection facility (QIF)). The devices may then be distributed (e.g., shipped) to various users, allowing a user of each device to obtain identical information directly from a respective one of the devices via the previously injected quantum entangled particles without directly exchanging any information.

Although FIG. 1 illustrates an environment and implementation in which various functionalities are performed by different devices, in some embodiments some or all of the functionalities of the requesting devices 100A-100N, verifying devices 110A-110N, and/or quantum entangled particle generator 120 are aggregated into a single device.

Example Implementing Apparatuses

Figure 2A:
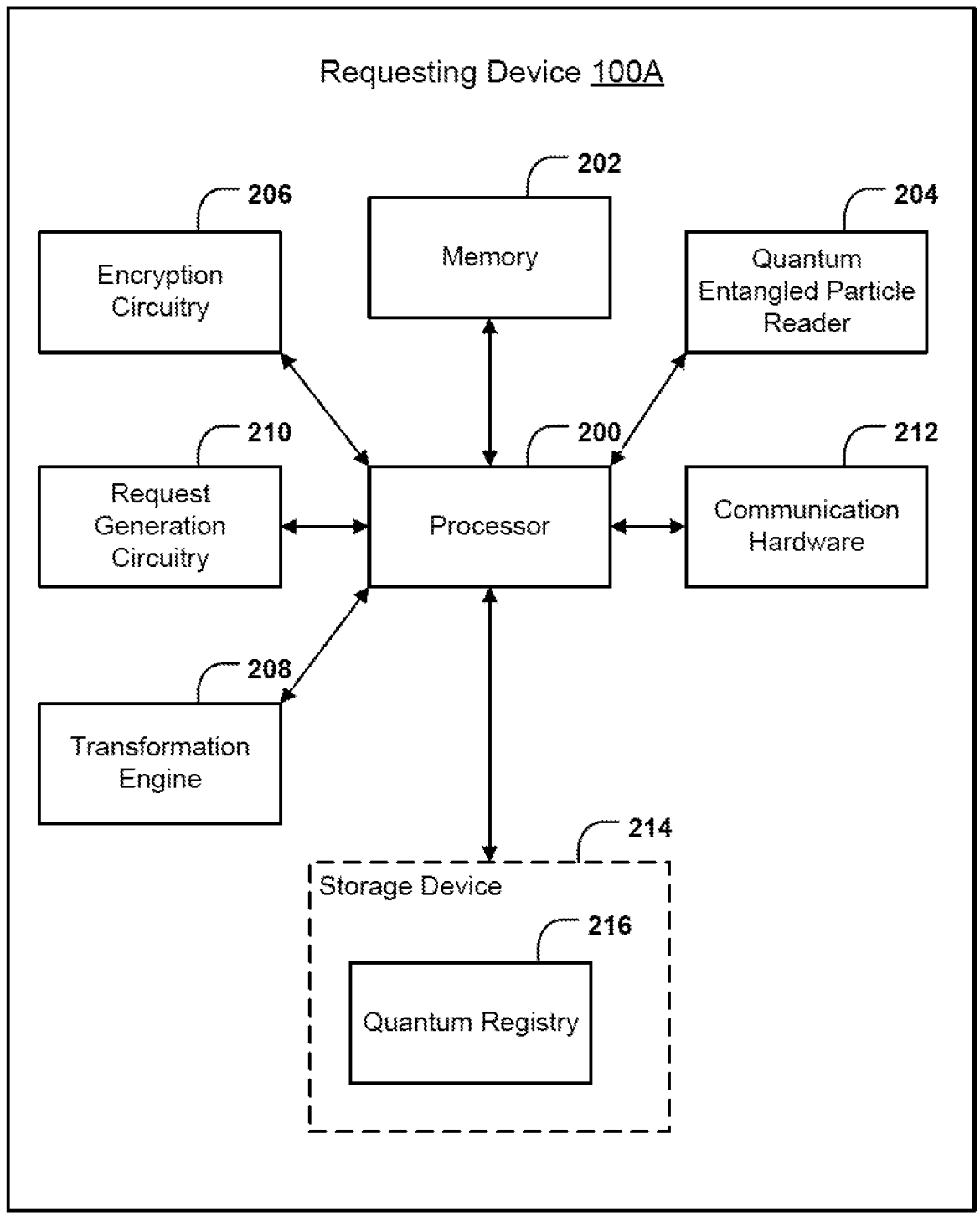
FIG. 2A illustrates a schematic block diagram of example circuitry embodying a requesting device that may perform various operations in accordance with some embodiments described herein.

Turning to FIG. 2A, any of requesting devices 100A-100N may be embodied by one or more computing devices or servers, shown as requesting device 100A. As illustrated in FIG. 2A, the requesting device 100A may include processor 200, memory 202, quantum entangled particle reader 204, encryption circuitry 206, transformation engine 208, request generation circuitry 210, communication hardware 212, and storage device 214, each of which will be described in greater detail below. While the various components are only illustrated in FIG. 2A as being connected with processor 200, it will be understood that the requesting device 100A may further comprise a bus (not expressly shown in FIG. 2A) for passing information amongst any combination of the various components of the requesting device 100A. The requesting device 100A may be configured to execute various operations described above in connection with FIG. 1 and below in connection with FIGS. 3A-4C.

The processor 200 (and/or co-processor or any other processor assisting or otherwise associated with the processor) may be in communication with the memory 202 via a bus for passing information amongst components of the apparatus. The processor 200 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the requesting device 100A, remote or "cloud" processors, or any combination thereof.

The processor 200 may be configured to execute software instructions stored in the memory 202 or otherwise accessible to the processor (e.g., software instructions stored on a separate or integrated storage device 214). In some cases, the processor may be configured to execute hard-coded functionality. As such, whether configured by hardware or software methods, or by a combination of hardware with software, the processor 200 represents an entity (e.g., physically embodied in circuitry) capable of performing operations according to various embodiments of the present invention while configured accordingly. Alternatively, as another example, when the processor 200 is embodied as an executor of software instructions, the software instructions may specifically configure the processor 200 to perform the algorithms and/or operations described herein when the software instructions are executed.

Memory 202 is non-transitory and may include, for example, one or more volatile and/or non-volatile memories. In other words, for example, the memory 202 may be an electronic storage device (e.g., a computer readable storage medium). The memory 202 may be configured to store information, data, content, applications, software instructions, or the like, for enabling the apparatus to carry out various functions in accordance with embodiments described herein.

The communication hardware 212 may be any means such as a device or circuitry embodied in either hardware or a combination of hardware and software that is configured to receive and/or transmit data from/to a network and/or any other device, circuitry, or module in communication with the requesting device 100A. In this regard, the communication hardware 212 may include, for example, a network interface for enabling communications with a wired or wireless communications network. For example, the communication hardware 212 may include one or more network interface cards, antennas, buses, switches, routers, modems, and supporting hardware and/or software, or any other device suitable for enabling communications via a network. Furthermore, the communication hardware 212 may include the processing circuitry for causing transmission of such signals to a network or for handling receipt of signals received from a network.

In addition, requesting device 100A further comprises quantum entangled particle reader 204 configured to "read" (e.g., interpret) quantum entangled particles to obtain bit sequences. When reading the quantum entangled particles, quantum entangled particle reader 204 may cause quantum registry sequences (e.g., the bit sequences) to be generated and/or stored in a quantum registry 216. Quantum entangled particle reader 204 may utilize processor 200, memory 202, or any other hardware component included in the requesting device 100A to perform these operations, as described in connection with FIGS. 3A-4C below. The quantum entangled particle reader 204 may further utilize communication hardware 212 to gather data from a variety of sources (e.g., verifying devices 110A-110N or storage device 214, as shown in FIG. 1), obtain quantum entangled particles for reading, and in some embodiments may utilize processor 200 and/or memory 202 to obtain and store bit sequences following the reading of quantum entangled particles.

In addition, requesting device 100A further comprises transformation engine 208 that is configured to perform a function operating on a set of request components to obtain a request data item. The function may be a one-way function that is computationally inexpensive to compute for every possible input, but is computationally expensive to invert for a given output from the function. This one-way function may be a cryptographic hash function, such as a hash-only function, a keyed-hash message authentication code (HMAC) function with a pre-determined key, a HMAC function with a derived key (e.g., derived from quantum registry sequences in quantum registry 216), and/or any other function for which it is practically infeasible to invert or reverse the computation. Alternatively, the transformation engine 208 may obtain the request data item using other types of functions operating on a set of request components (e.g., using a digital signature, a time stamp token, or the like) to obtain the request data item. Transformation engine 208 may utilize processor 200, memory 202, or any other hardware component included in the requesting device 100A to perform these operations, as described in connection with FIGS. 3A-4D below. The transformation engine 208 may further utilize communication hardware 212 to gather data from a variety of sources (e.g., verifying devices 110A-110N or storage device 214, as shown in FIG. 1), and in some embodiments may utilize processor 200 and/or memory 202 to obtain the request data item.

In addition, requesting device 100A further comprises encryption circuitry 206 that is configured to encrypt user authentication factors provided by users. Encryption circuitry 206 may encrypt user authentication factors in any manner, but the manner of encryption may be known or knowable to a verifying device. User authentication factors may include passwords, biometric factors, one-time-passcodes (OTPs), etc. Encryption circuitry 206 may utilize processor 200, memory 202, or any other hardware component included in the requesting device 100A to perform these operations, as described in connection with FIGS. 3A-4C below. The encryption circuitry 206 may further utilize communication hardware 212 to gather data from a variety of sources (e.g., verifying devices 110A-110N or storage device 214, as shown in FIG. 1), and in some embodiments may utilize processor 200 and/or memory 202 to encrypt user authentication factors obtained from users of requesting device 100A.

In addition, requesting device 100A further comprises request generation circuitry 210 that generates requests. The requests may be attempts to establish a secure connection with another device (e.g., verifying device 110A) throughout a distributed system. The requests may include information usable by a receiver of the request to authenticate or verify the requesting device 100A and/or the user thereof. Request generation circuitry 210 may utilize processor 200, memory 202, or any other hardware component included in the requesting device 100A to perform these operations, as described in connection with FIGS. 3A-4C below. The request generation circuitry 210 may further utilize communication hardware 212 to gather data from a variety of sources (e.g., verifying devices 110A-110N or storage device 214, as shown in FIG. 1), and in some embodiments may utilize processor 200 and/or memory 202 to generate requests for secure connections to other devices (e.g., verifying devices 110A-110N) throughout a distributed system.

Finally, requesting device 100A may include storage device 214 that stores data structures used by quantum entangled particle reader 204, encryption circuitry 206, transformation engine 208, and/or request generation circuitry 210 to provide their functionalities. Storage device 214 may be a non-transitory storage medium and may include any number and types of physical storage devices (e.g., hard disk drives, tape drives, solid state storage devices, etc.) and/or control circuitry (e.g., disk controllers usable to operate the physical storage devices and/or provide storage functionality such as redundancy, deduplication, etc.).

As noted above, quantum registry 216 may store any quantity of quantum registry sequences obtained by quantum entangled particle reader 204. One copy of quantum registry 216 may be hosted by requesting device 100A, while another identical copy of quantum registry 216 may be hosted by a second device (e.g., verifying device 110A) in a distributed system. The quantum registry sequences may be obtained by reading quantum entangled particles provided by quantum entangled particle generator 120. Consequently, requesting device 100A and the second device (e.g., verifying device 110A) may have access to identical quantum registry sequences that may be known to be secure (e.g., through processes for detecting snooping of information distributed via quantum entangled particles). In addition, quantum registry 216 may include any number of associations, categorizations, etc. to facilitate generation of requests to establish a secure connection. For example, quantum registry 216 may include an index and a status associated with each quantum registry sequence, the index indicating the location of the quantum registry sequence in quantum registry 216 and the status indicating whether the quantum registry sequence is unused, in-use, or used for authentication requests. Quantum registry 216 may be implemented using any number and types of data structures (e.g., databases, lists, tables, linked lists, etc.).

In an embodiment, quantum registry sequences may be obtained by verifying device 110A via quantum key distribution. Quantum entangled particle generator 120 may distribute pairs of quantum entangled particles to devices (e.g., requesting and verifying devices) throughout a distributed system. For example, one quantum entangled particle of each pair of quantum entangled particles may be distributed to requesting device 100A and the second quantum entangled particle of each pair of quantum entangled particles may be distributed to verifying device 110A. Therefore, requesting device 100A and verifying device 110A may have access to identical quantum entangled particles.

As described in greater detail below, quantum entangled particles may be read by quantum entangled particle reader 222 of verifying device 110A, thereby collapsing the entanglement of the quantum entangled particles and obtaining a quantum registry sequence (e.g., a bit sequence).

While illustrated in FIG. 2A as being a part of requesting device 100A, the quantum registry 216 may be stored (partially or entirely) in a different device operably connected to requesting device 100A.

Although components 200-214 are described in part using functional language, it will be understood that the particular implementations necessarily include the use of particular hardware. It should also be understood that certain of these components 200-214 may include similar or common hardware. For example, the quantum entangled particle reader 204, encryption circuitry 206, transformation engine 208, and request generation circuitry 210 may each at times leverage use of the processor 200, memory 202, communication hardware 212, and/or storage device 214, such that duplicate hardware is not required to facilitate operation of these physical elements of the requesting device 100A (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the requesting device 100A to perform the various functions described herein.

Although quantum entangled particle reader 204, encryption circuitry 206, transformation engine 208, and request generation circuitry 210 may leverage processor 200 or memory 202 as described above, it will be understood that any of these elements of requesting device 100A may include one or more dedicated processor, specially configured field programmable gate array (FPGA), or application specific interface circuit (ASIC) to perform its corresponding functions, and may accordingly leverage processor 200 executing software stored in a memory (e.g., memory 202), or memory 202, or communication hardware 212 for enabling any functions not performed by special-purpose hardware elements. In all embodiments, however, it will be understood that the processor 200, memory 202, communication hardware 212, and storage device 214 are implemented via particular machinery designed for performing the functions described herein in connection with such elements of requesting device 100A.

In some embodiments, various components of the requesting device 100A may be hosted remotely (e.g., by one or more cloud servers) and thus need not physically reside on the corresponding requesting device 100A. Thus, some or all of the functionality described herein may be provided by third-party circuitry. For example, a given requesting device 100A may access one or more third-party circuitries via any sort of networked connection that facilitates transmission of data and electronic information between the requesting device 100A and the third-party circuitries. In turn, that requesting device 100A may be in remote communication with one or more of the other components describe above as comprising the requesting device 100A.

As will be appreciated based on this disclosure, embodiments described herein may be implemented by a requesting device 100A. Furthermore, some embodiments may take the form of a computer program product comprising software instructions stored on at least one non-transitory computer-readable storage medium (e.g., memory 202). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by requesting device 100A as described in FIG. 2A, that loading the software instructions onto a computing device or apparatus produces a special-purpose machine comprising the means for implementing various functions described herein.

Figure 2B:
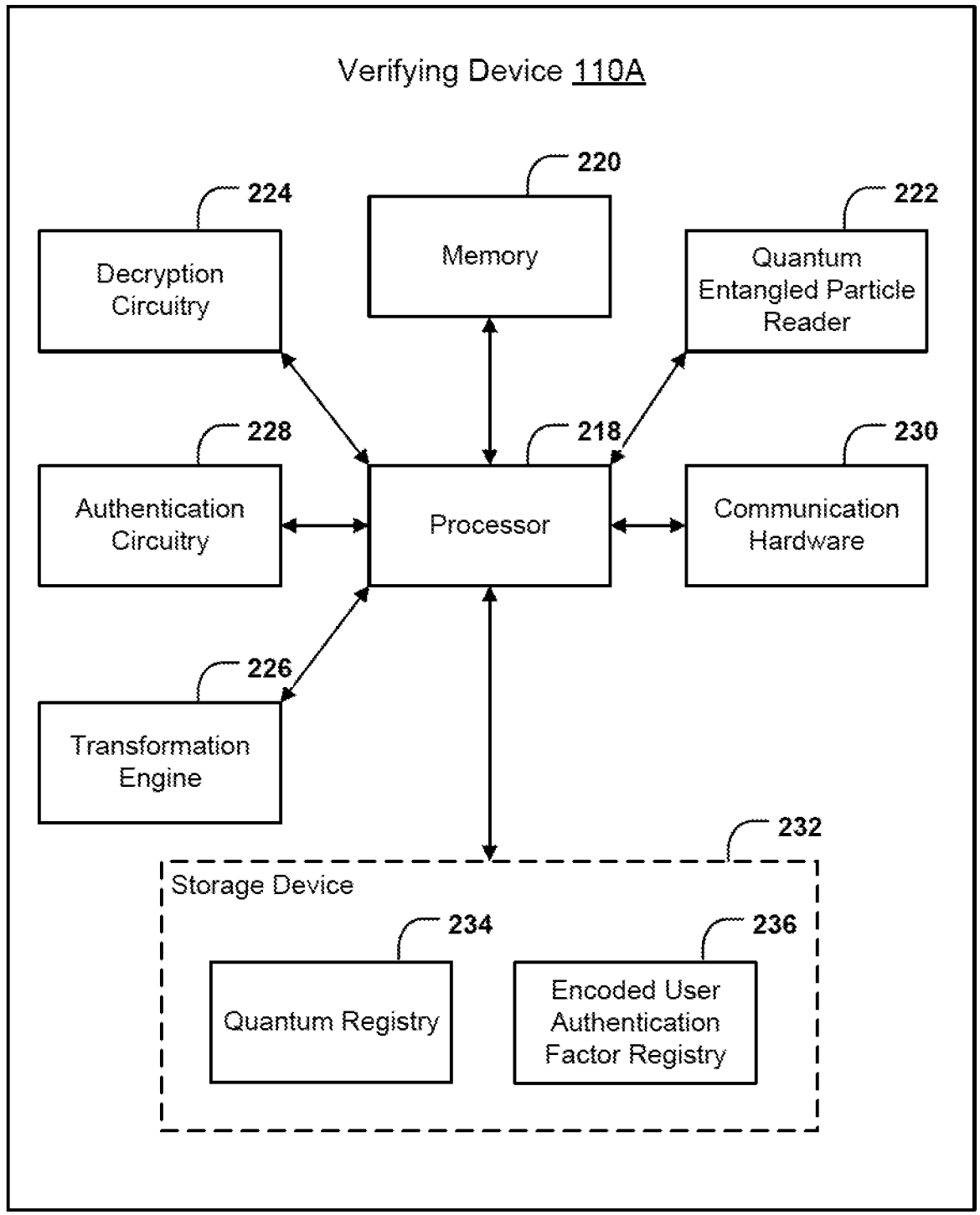
FIG. 2B illustrates a schematic block diagram of example circuitry embodying a verifying device that may perform various operations in accordance with some embodiments described herein.

Turning to FIG. 2B, any of verifying devices 110A-110N may be embodied by one or more computing devices or servers, shown as verifying device 110A in FIG. 2B. As illustrated in FIG. 2B, the verifying device 110A may include processor 218, memory 220, quantum entangled particle reader 222, decryption circuitry 224, transformation engine 226, authentication circuitry 228, communication hardware 230, and storage device 232, each of which will be described in greater detail below. While the various components are only illustrated in FIG. 2B as being connected with processor 218, it will be understood that the verifying device 110A may further comprise a bus (not expressly shown in FIG. 2B) for passing information amongst any combination of the various components of the verifying device 110A. The verifying device 110A may be configured to execute various operations described above in connection with FIG. 1 and below in connection with FIGS. 3A-4C.

The processor 218 (and/or co-processor or any other processor assisting or otherwise associated with the processor) may be in communication with the memory 220 via a bus for passing information amongst components of the apparatus. The processor 218 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the verifying device 110A, remote or "cloud" processors, or any combination thereof.

The processor 218 may be configured to execute software instructions stored in the memory 220 or otherwise accessible to the processor (e.g., software instructions stored on a separate or integrated storage device 232). In some cases, the processor may be configured to execute hard-coded functionality. As such, whether configured by hardware or software methods, or by a combination of hardware with software, the processor 218 may represent an entity (e.g., physically embodied in circuitry) capable of performing operations according to various embodiments of the present invention while configured accordingly. Alternatively, as another example, when the processor 218 is embodied as an executor of software instructions, the software instructions may specifically configure the processor 218 to perform the algorithms and/or operations described herein when the software instructions are executed.

Memory 220 is non-transitory and may include, for example, one or more volatile and/or non-volatile memories. In other words, for example, the memory 220 may be an electronic storage device (e.g., a computer readable storage medium). The memory 220 may be configured to store information, data, content, applications, software instructions, or the like, for enabling the apparatus to carry out various functions in accordance with embodiments described herein.

The communication hardware 230 may be any means such as a device or circuitry embodied in either hardware or a combination of hardware and software that is configured to receive and/or transmit data from/to a network and/or any other device, circuitry, or module in communication with verifying device 110A. In this regard, the communication hardware 230 may include, for example, a network interface for enabling communications with a wired or wireless communications network. For example, the communication hardware 230 may include one or more network interface cards, antennas, buses, switches, routers, modems, and supporting hardware and/or software, or any other device suitable for enabling communications via a network. Furthermore, the communication hardware 230 may include the processing circuitry for causing transmission of such signals to a network or for handling receipt of signals received from a network.

In addition, verifying device 110A further comprises quantum entangled particle reader 222 configured to "read" (e.g., interpret) quantum entangled particles to obtain bit sequences. When reading the quantum entangled particles, quantum entangled particle reader 222 may cause quantum registry sequences (e.g., the bit sequences) to be generated and/or stored in a quantum registry 234 along with some identifying information. The identifying information may include an index, the index indicating the location of the quantum registry sequence in the quantum registry 234 and a status, the status indicating whether the quantum registry sequence is unused, in-use, or used for an authentication process. Quantum entangled particle reader 222 may utilize processor 218, memory 220, or any other hardware component included in the verifying device 110A to perform these operations, as described in connection with FIGS. 3A-4C below. The quantum entangled particle reader 222 may further utilize communication hardware 230 to gather data from a variety of sources (e.g., requesting devices 100A-100N or storage device 232, as shown in FIG. 1), and in some embodiments may utilize processor 218 and/or memory 220 to obtain and store bit sequences following the reading of quantum entangled particles.

In addition, verifying device 110A further comprises transformation engine 226 that is configured to perform a function operating on a set of request components to obtain a request data item. This function may be a cryptographic hash function, such as a hash-only function, a keyed-hash message authentication code (HMAC) function with a pre-determined key, a HMAC function with a derived key (e.g., derived from quantum registry sequences in quantum registry 216), and/or any other function for which it is practically infeasible to invert or reverse the computation. Alternatively, the transformation engine 208 may obtain the request data item using other types of functions operating on a set of request components (e.g., using a digital signature, a time stamp token, or the like) to obtain the request data item. Transformation engine 226 may utilize processor 218, memory 220, or any other hardware component included in the requesting device 100A to perform these operations, as described in connection with FIGS. 3A-4C below. The transformation engine 226 may further utilize communication hardware 230 to gather data from a variety of sources (e.g., requesting devices 100A-100N or storage device 232, as shown in FIG. 1), and in some embodiments may utilize processor 200 and/or memory 202 to obtain the request data item.

In addition, verifying device 110A further comprises decryption circuitry 224 that decrypts encrypted user authentication factors obtained from sources (e.g., requesting devices 100A-100N). User authentication factors may include passwords, biometric factors, a one-time-passcodes (OTPs), etc. Decryption circuitry 224 may utilize processor 218, memory 220, or any other hardware component included in the verifying device 110A to perform these operations, as described in connection with FIGS. 3A-4C below. The decryption circuitry 224 may further utilize communication hardware 230 to gather data from a variety of sources (e.g., requesting devices 100A-100N or storage device 232, as shown in FIG. 1), and in some embodiments may utilize processor 218 and/or memory 220 to decrypt encrypted user authentication factors obtained from sources (e.g., requesting devices 100A-100N) throughout a distributed system.

In addition, requesting device 100A further comprises authentication circuitry 228 that authenticates requests, the requests being attempts to establish a secure connection from another device (e.g., requesting device 100A) throughout a distributed system. Authentication circuitry 228 may utilize processor 218, memory 220, or any other hardware component included in the verifying device 110A to perform these operations, as described in connection with FIGS. 3A-4C below. The authentication circuitry 228 may further utilize communication hardware 230 to gather data from a variety of sources (e.g., requesting devices 100A-110N or storage device 232, as shown in FIG. 1), and in some embodiments may utilize processor 218 and/or memory 220 to generate requests for secure connections to other devices (e.g., requesting devices 100A-100N) throughout a distributed system.

Finally, requesting device 100A may include storage device 232 that stores data structures used by quantum entangled particle reader 222, transformation engine 226, and/or authentication circuitry 228 to provide their functionalities. Storage device 232 may be a non-transitory storage medium and may include any number and types of physical storage devices (e.g., hard disk drives, tape drives, solid state storage devices, etc.) and/or control circuitry (e.g., disk controllers usable to operate the physical storage devices and/or provide storage functionality such as redundancy, deduplication, etc.).

As noted above, quantum registry 234 may store any quantity of quantum registry sequences obtained by quantum entangled particle reader 222. In addition, quantum registry 234 may include an index and a status associated with each quantum registry sequence, the index indicating the location of the quantum registry sequence in quantum registry 234 and the status indicating whether the quantum registry sequence is used, in-use, or used for authentication requests. Quantum registry 234 may be implemented using any number and types of data structures (e.g., databases, lists, tables, linked lists, etc.).

In an embodiment, quantum registry sequences may be obtained by verifying device 110A via quantum key distribution. Quantum entangled particle generator 120 may distribute pairs of quantum entangled particles to devices (e.g., requesting and verifying devices) throughout a distributed system. For example, one quantum entangled particle of each pair of quantum entangled particles may be distributed to requesting device 100A and the second quantum entangled particle of each pair of quantum entangled particles may be distributed to verifying device 110A. Therefore, requesting device 100A and verifying device 110A may have access to identical quantum entangled particles.

Quantum entangled particles may be read by quantum entangled particle reader 222 thereby collapsing the entanglement of the quantum entangled particles and obtaining a quantum registry sequence (e.g., a bit sequence). The quantum entangled particle reader 222 may store the quantum registry sequences in quantum registry 234 along with some identifying information. The identifying information may include an index, the index indicating the location of the quantum registry sequence in the quantum registry 234 and a status, the status indicating whether the quantum registry sequence is unused, in-use, or used for an authentication process.

Encoded user authentication factor registry 236 may store any type and quantity of encoded user authentication factors (e.g., encoded passwords, encoded biometric factors (e.g., fingerprints), encoded one-time-passcodes (OTPs), or the like) usable to verify the identity of users in order to authenticate secure communication requests. Encoded user authentication factor registry 236 may be implemented using any number and types of data structures (e.g., databases, lists, tables, linked lists, etc.).

In an embodiment, encoded user authentication factors of the encoded user authentication factor registry 236 may be generated, distributed, and/or obtained via any method. An encoded user authentication factor may include, for example, a hashed password. In this example, a hashed password may be obtained from a source (e.g., requesting device 100A) throughout a distributed system via communications network 130. The hashed password may be obtained by performing any type of one-way function on a password provided by a user. This one-way function may be a cryptographic hash function, such as a hash-only function, a keyed-hash message authentication code (HMAC) function with a pre-determined key, a HMAC function with a derived key (e.g., derived from quantum registry sequences in quantum registry 216), and/or any other function for which it is practically infeasible to invert or reverse the computation. One-way functions may be performed via other methods without departing from embodiments disclosed herein. Encoded user authentication factors (e.g., hashed passwords) may be stored by verifying device 110A in encoded user authentication factor registry 236 in order to verify the identity of users attempting to establish secure connections with verifying device 110A.

While illustrated in FIG. 2B as being a part of verifying device 110A, the quantum registry 234 and encoded user authentication factor registry 236 may be a part of a different device operably connected to verifying device 110A.

Although components 218-232 are described in part using functional language, it will be understood that the particular implementations necessarily include the use of particular hardware. It should also be understood that certain of these components 218-232 may include similar or common hardware. For example, the quantum entangled particle reader 222, decryption circuitry 224, transformation engine 226, and authentication circuitry 228 may each at times leverage use of the processor 218, memory 220, communication hardware 230, and/or storage device 232, such that duplicate hardware is not required to facilitate operation of these physical elements of the verifying device 110A (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the verifying device 110A to perform the various functions described herein.

Although quantum entangled particle reader 222, decryption circuitry 224, transformation engine 226, and authentication circuitry 228 may leverage processor 218 or memory 220 as described above, it will be understood that any of these elements of verifying device 110A may include one or more dedicated processor, specially configured field programmable gate array (FPGA), or application specific interface circuit (ASIC) to perform its corresponding functions, and may accordingly leverage processor 218 executing software stored in a memory (e.g., memory 220), or memory 220, or communication hardware 230 for enabling any functions not performed by special-purpose hardware elements. In all embodiments, however, it will be understood that the processor 218, memory 220, communication hardware 230, and storage device 232 are implemented via particular machinery designed for performing the functions described herein in connection with such elements of verifying device 110A.

In some embodiments, various components of the verifying device 110A may be hosted remotely (e.g., by one or more cloud servers) and thus need not physically reside on the corresponding verifying device 110A. Thus, some or all of the functionality described herein may be provided by third-party circuitry. For example, a given verifying device 110A may access one or more third-party circuitries via any sort of networked connection that facilitates transmission of data and electronic information between the verifying device 110A and the third-party circuitries. In turn, that verifying device 110A may be in remote communication with one or more of the other components described above as comprising the verifying device 110A.

As will be appreciated based on this disclosure, embodiments described herein may be implemented by a verifying device 110A. Furthermore, some embodiments may take the form of a computer program product comprising software instructions stored on at least one non-transitory computer-readable storage medium (e.g., memory 220). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by verifying device 110A as described in FIG. 2B, that loading the software instructions onto a computing device or apparatus produces a special-purpose machine comprising the means for implementing various functions described herein.

Example Apparatus Operations for Communication Security

Turning to FIGS. 3A-3D, example flowcharts are illustrated that include example operations implemented by various embodiments described herein for securing communications between devices. The operations illustrated in FIG. 3A may, for example, be performed by requesting devices 100A-100N shown in FIG. 1, which may in turn be embodied by requesting device 100A, which is shown and described in connection with FIG. 2A. To perform the operations described below, the requesting device 100A may utilize one or more of processor 200, memory 202, quantum entangled particle reader 204, encryption circuitry 206, transformation engine 208, request generation circuitry 210, communication hardware 212, storage device 214, and/or any combination thereof.

The operations illustrated in FIGS. 3B and 3C may, for example, be performed by verifying devices 110A-110N shown in FIG. 1, which may in turn be embodied by verifying device 110A, which is shown and described in connection with FIG. 2B. To perform the operations described below, the verifying device 110A may utilize one or more of processor 218, memory 220, quantum entangled particle reader 222, decryption circuitry 224, transformation engine 226, authentication circuitry 228, communication hardware 230, storage device 232, and/or any combination thereof. The operations illustrated in FIG. 3D may be performed by any of the requesting devices or verifying devices shown in FIG. 1.

Figure 3A:
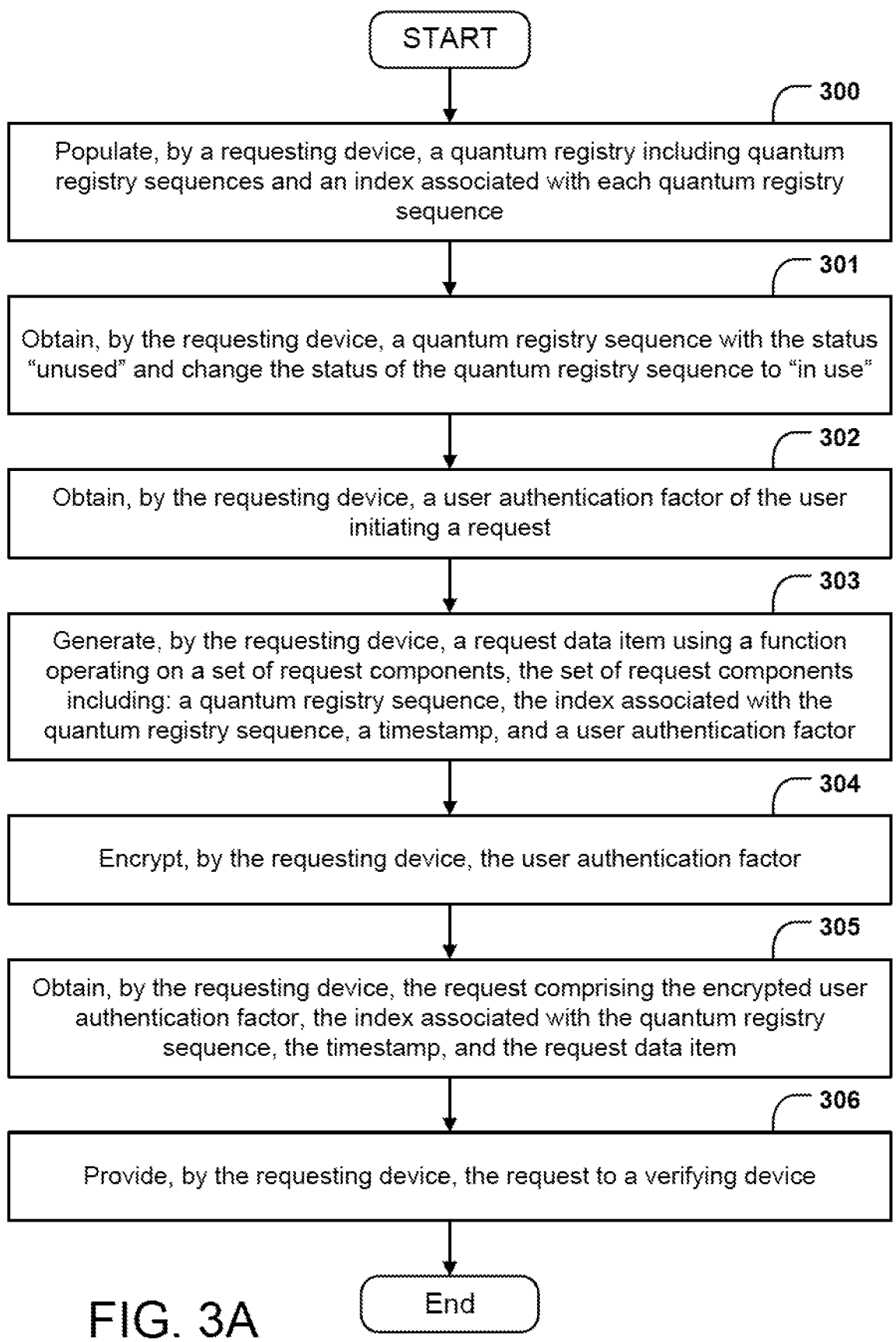
FIG. 3A illustrates an example flowchart for requesting establishment of a secure connection between a requesting device and a verifying device, in accordance with some embodiments described herein.

Turning first to FIG. 3A, example operations are shown for requesting establishment of a secure connection between a requesting device and a verifying device. For example, an example requesting device 100A may be performing services that may cause it to need to exchange sensitive information with a verifying device. To reduce the likelihood of sensitive information being distributed to or intercepted by an unintended recipient, the requesting device may generate an authentication request including an encrypted user authentication factor and a shared secret in order to enable verification of the identity of the user initiating the request.

As shown by operation 300, the requesting device 100A includes means, such as processor 200, memory 202, quantum entangled particle reader 204, or the like, for populating a quantum registry 216. The quantum registry 216 may include quantum registry sequences and an index associated with each quantum registry sequence. Quantum registry sequences may be obtained, for example from quantum entangled particles. The quantum entangled particle reader 204 of the requesting device 100A may read the quantum entangled particles (e.g., by collapsing the entanglement) to obtain bit sequences. These bit sequences may make up the quantum registry sequences. Each quantum registry sequence may be assigned a corresponding index indicating the location of the quantum registry sequence in the quantum registry 216.

In an embodiment, the quantum entangled particles may be transmitted to the requesting device 100A via a transmission medium (e.g., quantum distribution medium 140) over which optical radiation is transmitted between a quantum entangled particle generator 120 and the requesting device 100A. Generally, a carrier optical signal may be transmitted over the transmission medium along with the first quantum entangled particle. For example, the carrier optical signal may provide for the transmission of data from the quantum entangled particle generator 120 and/or other devices to the requesting device 100A. In one embodiment, the bit sequence associated with the first quantum entangled particle is unknown and indeterminate while transmitted to the requesting device 100A. In other embodiments, the bit sequence associated with the first quantum entangled particle is unknown (e.g., not yet measured) but may be determinate by virtue of the bit sequence associated with a second quantum entangled particle being measured in a separate operation (e.g., performed by a verifying device 110A).

As shown by operation 301, the requesting device 100A includes means, such as processor 200, memory 202, quantum entangled particle reader 204, or the like, for obtaining a quantum registry sequence with the status "unused" and changing the status of the quantum registry sequence to "in-use." Each quantum registry sequence in quantum registry 216 may be assigned a status, the status being unused, in-use, or used. A quantum registry sequence with the status "unused" may indicate that the quantum registry sequence with the status "unused" is available to be selected by requesting device 100A for use in an authentication process. The quantum registry sequence with the status "unused" may be chosen from an ordered list of quantum registry sequences with the status "unused." The status may be changed to "in-use" to signal that the selected quantum registry sequence may be in-use for an authentication process.

In an embodiment, requesting device 100A may obtain a quantum registry sequence with the status "unused" and change the status of the quantum registry sequence to "in-use" in order to initiate an authentication process to request access to resources secured by a second device (e.g., verifying device 110A) in a distributed system.

The "unused" quantum registry sequence may comprise a shared secret to be used as an authentication factor during the communications between the requesting device 100A and the verifying device 110A. In another embodiment, "unused" quantum registry sequences may be selected for use in establishing a symmetric cryptographic key with a second device (e.g., verifying device 110A) in a distributed system. The "unused" quantum registry sequence may be used to encrypt, based on a shared encryption method, sensitive information (e.g., personal information, financial information, etc.) that may be transmitted between devices (e.g., the requesting device 100A and the verifying device 110A).

As shown by operation 302, the requesting device 100A includes means, such as processor 200, memory 202, communication hardware 212, or the like, for obtaining a user authentication factor of the user initiating a request. The user authentication factor may include a password, biometric factor, OTP, or any other factor associated with the user initiating the request. The user authentication factor may be transmitted over a communications network (e.g., communications network 130) to requesting device 100A from a user of another device within the distributed system. Alternatively, the user may directly input the authentication factor into the requesting device 100A (e.g., via typing a password, reading a fingerprint, etc.).

As shown by operation 303, the requesting device 100A includes means, such as processor 200, memory 202, transformation engine 208, or the like, for generating a request data item using a function operating on a set of request components. The function may be a one-way function (e.g., a hash function), may include encoding the set of request components using a digital signature and/or may include encoding the set of request components using a time stamp token. The set of request components may include (i) an obtained quantum registry sequence, (ii) the index associated with the quantum registry sequence, (iii) a timestamp, and/or (iv) the obtained user authentication factor. For instance, the transformation engine 208 may apply a cryptographic hash function to the set of request components to obtain hashed request information (the request data item). The quantum registry sequence utilized in this process may be the quantum registry sequence with the status "unused" mentioned above. The timestamp may indicate the time of the generation of the request data item. The user authentication factor may be provided by a user at the time of the generation of the request data item (or prior to the generation of the request data item as described with relation to operation 302).

In an embodiment, the request data item may be generated by performing a one-way function on the information described above. This one-way function may be a cryptographic hash function, such as a hash-only function, a keyed-hash message authentication code (HMAC) function with a pre-determined key, a HMAC function with a derived key (e.g., from quantum registry sequences in quantum registry 216), and/or any other function for which it is practically infeasible to invert or reverse the computation. One-way functions may be performed via other methods without departing from embodiments disclosed herein. Consequently, the set of request components (e.g., the user authentication factor, timestamp, index, and quantum registry sequence) may not be obtained via the request data item even if an unintended recipient were to obtain the request data item.

As shown by operation 304, the requesting device 100A includes means, such as processor 200, memory 202, encryption circuitry 206, or the like, for encrypting the user authentication factor. As noted above, the user authentication factor may be a password, biometric factor, OTP, or the like, and may be provided by a user at the time of the request (or prior to the request). The user authentication factor may be previously established by a user and sources (e.g., requesting devices, verifying devices) as a means for the user to gain access to a secure communication over which to send sensitive information. The encryption method may be previously agreed upon by the requesting device 100A and verifying device 110A. Alternatively, the encryption method may be specified and sent along with the request from the requesting device 100A. The user authentication factor may be encrypted via symmetric key encryption utilizing an unused quantum registry sequence as the shared secret. User authentication factors may be encrypted via other methods without departing from embodiments disclosed herein.

In some embodiments, the requesting device 100A further includes means, such as processor 200, memory 202, encryption circuitry 206, communication hardware 212 or the like, for separately distributing indicia of the user authentication factor to the verifying device. For instance, encryption circuitry 206 may hash a password (using a one-way function as described elsewhere herein). Subsequently, communication hardware 212 may distribute a copy of the hash of the password to the verifying device. By doing so, the encrypted password is usable by the verifying device in conjunction with the hash of the password to verify that the user initiated the request.

As shown by operation 305, the requesting device 100A includes means, such as processor 200, memory 202, request generation circuitry 210, communication hardware 212, or the like, for obtaining a request comprising the encrypted user authentication factor, the index associated with the quantum registry sequence, the timestamp, and the request data item. The request may be a message intended to authenticate the verifying device 110A for establishing a secure communication channel.

In an embodiment, the request generation circuitry 210 of the requesting device 100A may obtain the request by generating the request using request generation circuitry 210. The request generation circuitry 210 may generate the request by obtaining the encrypted user authentication factor, the index associated with the quantum registry sequence, the timestamp, and the request data item from memory 202 and/or other locations.

In an embodiment, the communication hardware 212 of the requesting device 100A may obtain the request from another entity through a communications network (e.g., communications network 130). For example, the request may be generated by another entity by obtaining the encrypted user authentication factor, the index associated with the quantum registry sequence, the timestamp, and the request data item and providing the request to the requesting device 100A.

As shown by operation 306, the requesting device 100A includes means, such as processor 200, memory 202, communication hardware 212, or the like, for providing the request to a verifying device. The request may be provided to the verifying device by sending it (or portions thereof), via one or more messages or other type of communication protocol compliant data structure, via a communications network (e.g., communications network 130) to the verifying device. The request may be encapsulated within a security protocol such as transport layer security (TLS), secure shell (SSH), internet protocol security (IPsec), etc. to further increase security of the transmission.

The method may end following operation 306.

Figure 3B:
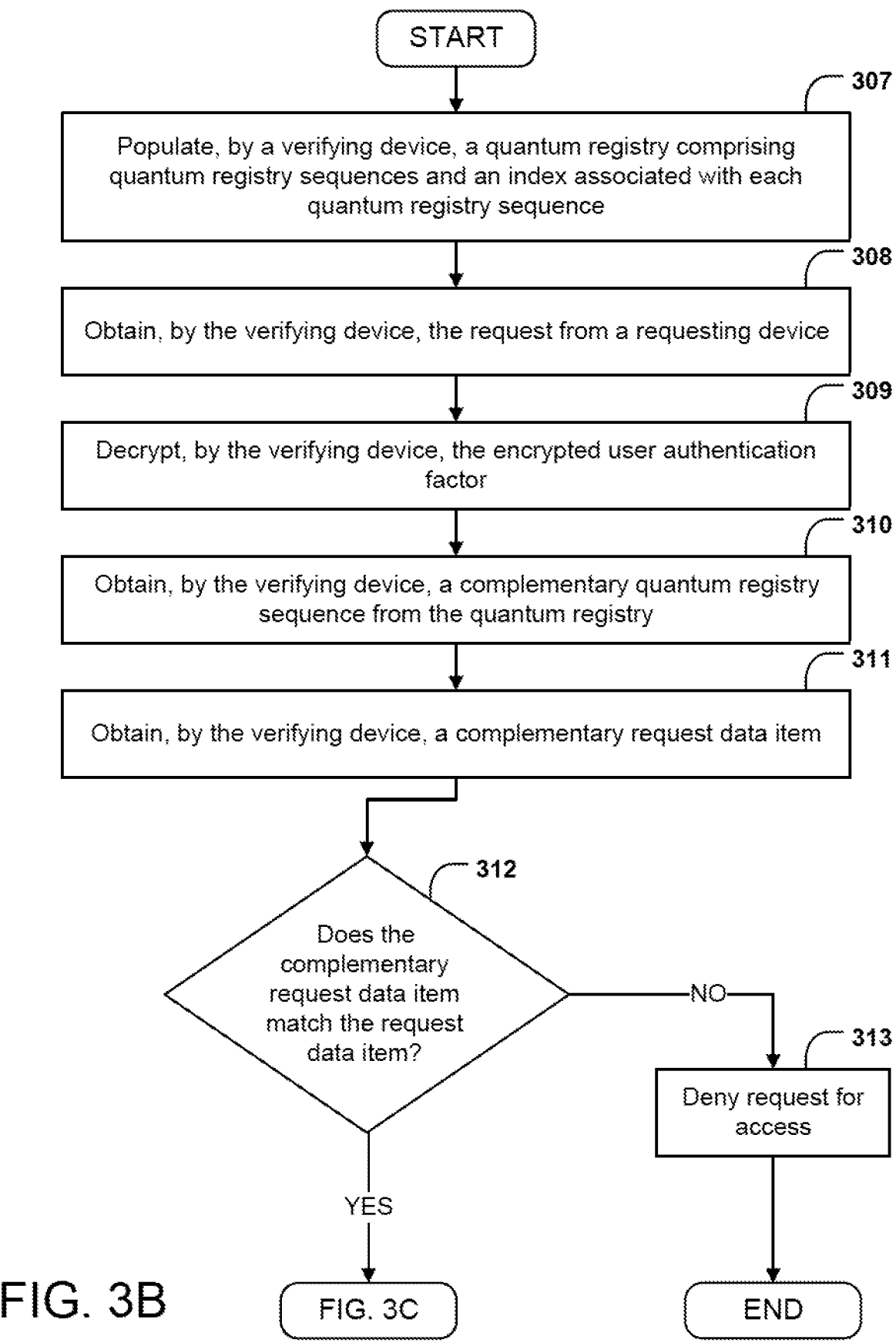
FIG. 3B illustrates an example flowchart for authentication of a requesting device by a verifying device, in accordance with some embodiments described herein.

Turning to FIG. 3B, example operations are shown for authentication of a requesting device (e.g., requesting device 100A) by a verifying device (e.g., verifying device 110A). For example, a verifying device 110A may receive a communication from a user of a requesting device 100A by receiving a request (e.g., comprising an encrypted user authentication factor, index, timestamp, and a request data item) from the requesting device 100A. However, when received, the verifying device 110A may not be able to immediately trust that the request is from the device (e.g., the requesting device 100A) from which request is alleged to originate.

As shown by operation 307, the verifying device 110A includes means, such as processor 218, memory 220, quantum entangled particle reader 222, or the like, for populating a quantum registry 234. The quantum registry 234 includes quantum registry sequences and an index associated with each quantum registry sequence. Quantum registry sequences may be obtained, for example from quantum entangled particles. The quantum entangled particle reader 222 of the verifying device 110A may read the quantum entangled particles (e.g., by collapsing the entanglement) to obtain bit sequences. These bit sequences may make up the quantum registry sequences. Each quantum registry sequence may be assigned a corresponding index indicating the location of the quantum registry sequence in the quantum registry 234.

In an embodiment, the quantum entangled particles may be transmitted to the verifying device 110A via a transmission medium (e.g., quantum distribution medium 140) over which optical radiation is transmitted between the quantum entangled particle generator 120 and the verifying device 110A. Generally, a carrier optical signal may be transmitted over the transmission medium along with the first quantum entangled particle. For example, the carrier optical signal may provide for the transmission of data from the quantum entangled particle generator 120 and/or other devices to the verifying device 110A. In one embodiment, the bit sequence associated with the first quantum entangled particle is unknown and indeterminate while transmitted to the verifying device 110A. In other embodiments, the bit sequence associated with the first quantum entangled particle is unknown (e.g., not yet measured) but may be determinate by virtue of the bit sequence associated with the second quantum entangled particle being measured in a separate operation (e.g., performed by a requesting device 100A).

As shown by operation 308, the verifying device 110A includes means, such as processor 218, memory 220, communication hardware 230, or the like, for obtaining a request from a requesting device 100A. The request may be provided to the verifying device 110A in the manner described previously, such as by sending it (or portions thereof), via one or more messages or other type of communication protocol compliant data structure, via a communication system to the verifying device 110A. The verifying device 110A may extract the encrypted user authentication factor from the request for use in operation 309. The verifying device 110A may also extract the request data item from the request for use in operation 312.

As shown by operation 309, the verifying device 110A includes means, such as processor 218, memory 220, decryption circuitry 224, or the like, for decrypting the encrypted user authentication factor. The user authentication factor may be a password, biometric factor, OTP, or the like, provided by a user at the time of the request. A password, for example, may be previously established by a user and sources (e.g., requesting devices 100A-100N, verifying devices 110A-110N, or the like) as a means for the user to gain access to a secure channel over which to send sensitive information. The encryption method may be previously agreed upon by the requesting device 100A and verifying device 110A. Alternatively, the encryption method may be specified and sent along with the request from the requesting device 100A. The user authentication factor may be encrypted via symmetric key encryption utilizing an unused quantum registry sequence as the shared secret. User authentication factors may be encrypted via other methods without departing from embodiments disclosed herein.

As shown by operation 310, the verifying device 110A includes means, such as processor 218, memory 220, authentication circuitry 228, or the like, for obtaining a complementary quantum registry sequence from the quantum registry 234. This quantum registry sequence is referred to as complementary because it corresponds to the quantum registry sequence obtained in a corresponding implementation of operation 301 performed by requesting device 100A (and described previously). The complementary quantum registry sequence may be obtained by locating the index specified in the request received from the requesting device 100A, identifying the complementary (e.g., identical) index in quantum registry 234, and selecting the quantum registry sequence associated with the complementary index. The respective quantum registries, indexes, and quantum registry sequences stored by the requesting and verifying devices may be identical and, therefore, an identical quantum registry sequence may be identified by both devices via exchanging an index. Therefore, the complementary quantum registry sequence may be identical to the quantum registry sequence utilized by the requesting device 100A to generate the request data item, and transmission of the quantum registry sequence between the requesting device 100A and the verifying device 110A need not occur.

As shown by operation 311, the verifying device 110A includes means, such as processor 218, memory 220, transformation engine 226, or the like, for obtaining a complementary request data item. The complementary request data item may include the decrypted user authentication factor, the index, the timestamp, and the complementary quantum registry sequence. The complementary request data item may be generated, for example, by performing a one-way function on the information described above. This one-way function may be a cryptographic hash function, such as a hash-only function, a keyed-hash message authentication code (HMAC) function with a pre-determined key, a HMAC function with a derived key (e.g., from quantum registry sequences in quantum registry 216), and/or any other function for which it is practically infeasible to invert or reverse the computation. Other functions (e.g., functions utilizing a digital signature, time stamp token, or the like) may be performed to encode the information described above without departing from embodiments disclosed herein. The complementary request data item may be intended to match the request data item.

As shown by operation 312, the verifying device 110A includes means, such as processor 218, memory 220, authentication circuitry 228, or the like, for determining whether the complementary request data item matches the request data item extracted from the request received from the requesting device 100A. If it is determined that the complementary request data item matches the request data item, then the method may proceed to FIG. 3C. Otherwise the method may proceed to operation 313.

As shown by operation 313, the verifying device 110A includes means, such as processor 218, memory 220, authentication circuitry 228, or the like, for denying the request for access. The request for access may be denied if, for example, the complementary request data item does not match the request data item provided by the requesting device 100A to the verifying device 110A.

In an embodiment, the complementary request data item not matching the request data item may indicate that the request came from a source other than the requesting device 100A pretending to be the requesting device 100A. In this scenario, the other source may have gained access to the quantum entangled particles, the index, the timestamp, and/or the user authentication factor. However, the quantum entangled particles may only be read twice (e.g., the requesting device 100A and verifying device 110A). If the quantum entangled particles are read a third time, a different quantum registry sequence may result. Therefore, if the quantum registry sequences for a given index do not match, there may have been some interference during the process of distributing quantum entangled particles to the requesting device 100A and the verifying device 110A.

In an embodiment, denying the request for access may involve sending a notification to the requesting device 100A that the request to establish a secure communication channel has been denied, resources associated with the verifying device 110A may not be accessed, and sensitive information may not be exchanged. In addition, denying the request for access may include an indication that the quantum registry sequence may be compromised. Additional operations may additionally be taken as a consequence of denial of the request for access, such as alerting an appropriate third party, preventing all or certain subsequent external authentication requests for some period of time (even authorized authentication requests), or the like.

The method may end following operation 313.

Figure 3C:
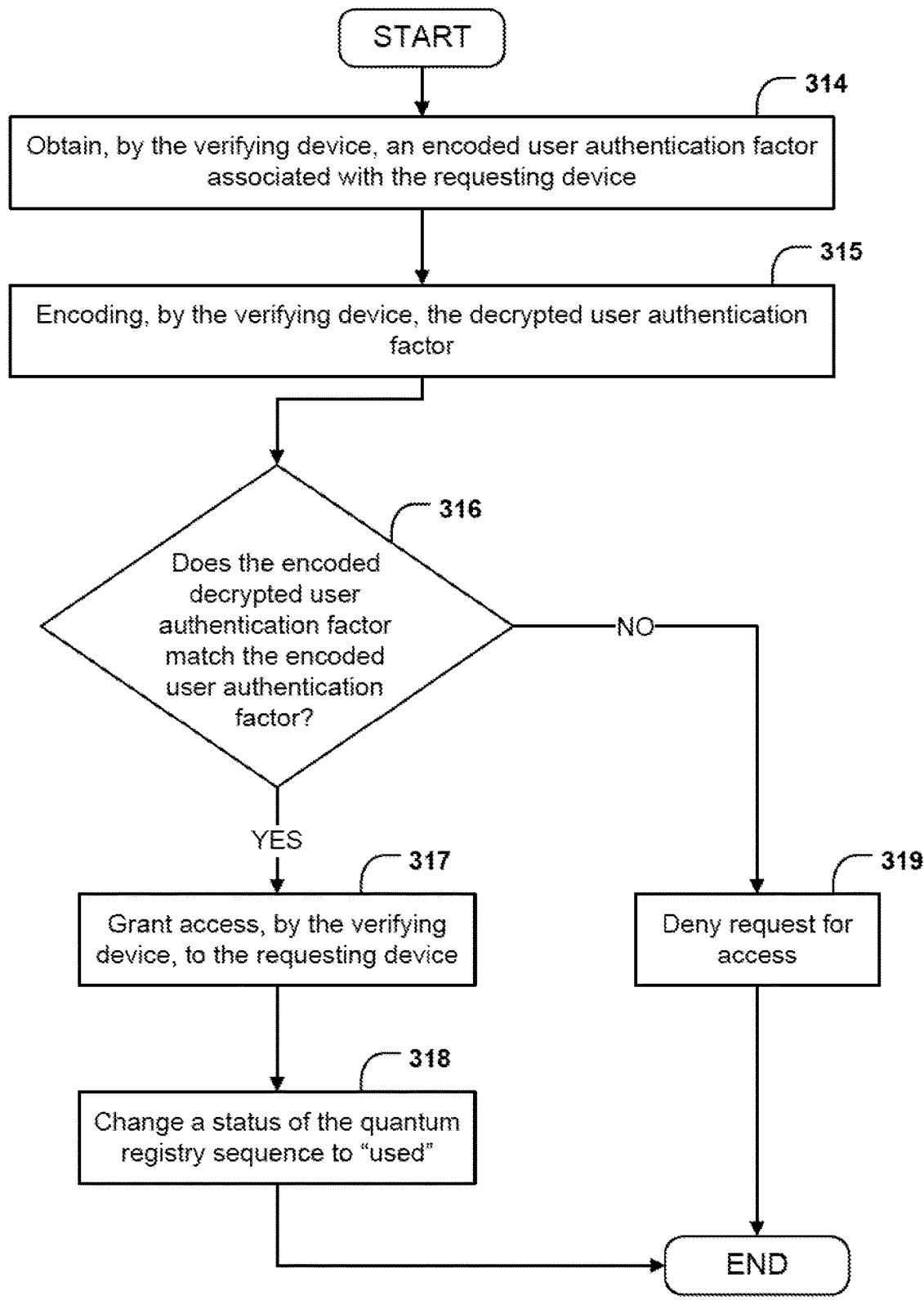
FIG. 3C illustrates an example flowchart for verifying the identity of the user initiating the request for establishing a secure connection, in accordance with some embodiments described herein.

Turning to FIG. 3C, example operations are shown for verifying the identity of the user initiating the request for establishing a secure connection from requesting device 100A. For example, a verifying device 110A may determine that the complementary request data item matches the request data item provided by requesting device 100A. However, both the complementary request data item and the request data item may be based on a password (and/or other user authentication factor) inputted by a user at the time of (or prior to generation of) the request. Although the device may be authenticated via the request data item, a second authentication factor may involve determining that the user authentication factor provided by the user matches the user authentication factor associated with the user. The operations in FIG. 3C may be a continuation of the operations in FIG. 3B.

As shown by operation 314, the verifying device 110A includes means, such as processor 218, memory 220, authentication circuitry 228, or the like, for obtaining an encoded user authentication factor associated with the requesting device. The encoded user authentication factor (e.g., a hashed password) may be obtained from encoded user authentication factor registry 236 stored in storage device 232 of verifying device 110A. In an example where the user authentication factor is a password encoded using a hash function, hashed passwords may be generated by performing one-way functions (e.g., cryptographic hash functions) on passwords provided by users approved for exchanging sensitive information between devices (e.g., requesting devices and verifying devices) throughout a distributed system. The hashed password associated with the requesting device may be previously established by the requesting and verifying devices. Hashed passwords may be provided by requesting devices 100A-100N, generated by verifying devices 110A-110N, and/or provided to the verifying devices 110A-110N by another entity via communications network 130. Other encoded user authentication factors other than passwords (e.g., biometric fingerprints, one-time-passcodes (OTPs), or the like, may also be obtained from encoded user authentication factor registry 236 and encoded using functions other than hash functions (e.g., a function utilizing a digital signature, a function utilizing a time stamp token, etc.).

As shown by operation 315, the verifying device 110A includes means, such as processor 218, memory 220, transformation engine 226, or the like, for encoding the decrypted user authentication factor. This may comprise performing a function (e.g., a cryptographic hash function, a function utilizing a digital signature, a function utilizing a time stamp token, or the like) on the decrypted user authentication factor that is previously obtained by the verifying device 110A decrypting the encrypted user authentication factor included in a request received from requesting device 100A.

For example, the function may be a one-way function. The one-way function may be a cryptographic hash function, such as a hash-only function, a keyed-hash message authentication code (HMAC) function with a pre-determined key, a HMAC function with a derived key (e.g., from quantum registry sequences in quantum registry 234), and/or any other function for which it is practically infeasible to invert or reverse the computation. One-way functions may be performed via other methods without departing from embodiments disclosed herein. The encoded decrypted user authentication factor may be intended to match the encoded user authentication factor associated with the requesting device and/or the user of the requesting device stored in encoded user authentication factor registry 236 by the verifying device.

As shown by operation 316, the verifying device 110A includes means, such as processor 218, memory 220, authentication circuitry 228, or the like, for determining whether the encoded decrypted user authentication factor matches the encoded user authentication factor. As an example, a hashed decrypted password may be compared to a hashed password. If the decrypted hashed password matches the hashed password, the method may proceed to operation 317. Otherwise, the method may proceed to operation 319.

As shown by operation 317, the verifying device 110A includes means, such as processor 218, memory 220, authentication circuitry 228, or the like, for granting access to the requesting device 100A. Granting access may entail allowing for the exchange of sensitive information between requesting device 100A and verifying device 110A via establishment of a secure connection. Establishing the secure connection may include agreeing on a shared method for encrypting sensitive information. This shared method may be previously established, shared as part of the request for access, and/or established by one of the devices following the granting of access by the verifying device. The encryption method may be a symmetric cryptographic key based on an unused quantum registry sequence. In this scenario, verifying device 110A may transmit an index to requesting device 100A to establish the cryptographic key. Following the granting of access by verifying device 110A, requesting device 100A may be able exchange sensitive information with verifying device 110A. As mentioned previously, sensitive information may be encrypted prior to the exchange.

As shown by operation 318, the verifying device 110A includes means, such as processor 218, memory 220, authentication circuitry 228, or the like, for changing a status of the quantum registry sequence to "used." The quantum registry sequence used to authenticate requesting device 100A may not be reliably used in a second authentication process. Therefore, verifying device 110A may change the status of the quantum registry sequence from "in-use" to "used." As a secure connection has been established between requesting device 100A and verifying device 110A, verifying device 110A may send a message to requesting device 100A indicating that the status should be changed in the quantum registry 216 hosted by the requesting device 100A. By doing so, both the requesting device 100A and verifying device 110A may have identical, updated quantum registries for use in future authentication processes.

The method may end following operation 318.

Returning to operation 316, the method may proceed to operation 319 if the encoded decrypted user authentication factor does not match the encoded user authentication factor.

As shown by operation 319, the verifying device 110A includes means, such as processor 218, memory 220, authentication circuitry 228, or the like, for denying the request for access. The request for access may be denied if the encoded decrypted user authentication factor does not match the encoded user authentication factor stored by the verifying device 110A in encoded user authentication factor registry 236. In an embodiment, the encoded user authentication factor may be a hashed password. The hashed decrypted password not matching the hashed password may indicate that the request came from a user other than the user associated with requesting device 100A pretending to be the user associated with requesting device 100A. In this scenario, the other user may have gained access to portions of the request information. In a second scenario, the hashed decrypted password may not match the hashed password if the user inadvertently entered an incorrect password during the authentication process. Denying the request for access may involve sending a notification to the requesting device that the request to establish a secure communication channel has been denied, resources associated with the verifying device may not be accessed, and sensitive information may not be exchanged.

The method may end following operation 319.

Figure 3D:
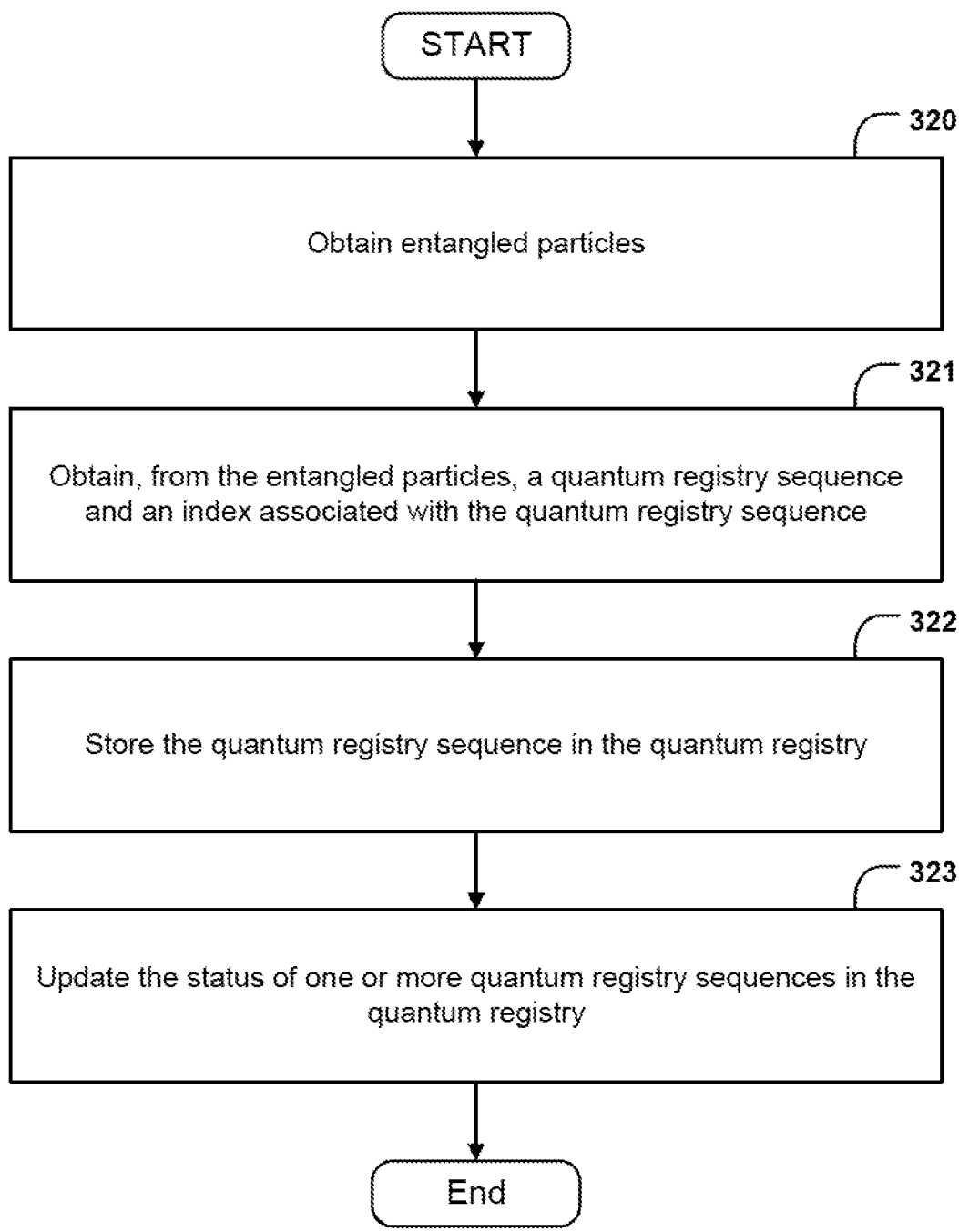
FIG. 3D illustrates an example flowchart for establishing and updating quantum registries via quantum key distribution, in accordance with some embodiments described herein.

Turning to FIG. 3D, example operations are shown for establishing and updating quantum registries via quantum key distribution by requesting devices 100A-100N and verifying devices 110A-110N. In order to establish shared secrets, requesting devices 100A-100N and verifying devices 110A-110N may obtain identical quantum entangled particles from a quantum entangled particle generator 120 via a quantum distribution medium 140 as shown in FIG. 1. The operations in FIG. 3D may be performed at any time (e.g., prior to, after, and/or during an authentication process).

As shown by operation 320, each of the requesting device 100A and verifying device 110A includes means, such as a processor, memory, quantum entangled particle reader, or the like, for obtaining quantum entangled particles. The quantum entangled particles may be provided by quantum entangled particle generator 120 via quantum distribution medium 140. Quantum entangled particles may be generated in pairs by the quantum entangled particle generator 120 and one quantum entangled particle of each pair of quantum entangled particles may be distributed to requesting device 100A. Similarly, one quantum entangled particle of each pair of quantum entangled particles may be distributed to verifying device 110A.

As shown by operation 321, each of the requesting device 100A and verifying device 110A includes means, such as a respective processor, memory, quantum entangled particle reader, or the like, for obtaining, from the quantum entangled particles, a quantum registry sequence and an index associated with the quantum registry sequence. The quantum registry sequence may be obtained by, for example, by reading the quantum entangled particles provided by the quantum entangled particle generator 120. By reading the quantum entangled particles, the quantum entangled particle reader may collapse the entanglement of the quantum entangled particles and obtain a bit sequence from the quantum entangled particles. This bit sequence may be a stored as a quantum registry sequence in a quantum registry (e.g., quantum registry 216 of an example requesting device 100A or quantum registry 234 of an example verifying device 110A). For example, a quantum registry sequence may be the following bit sequence: 100110001011001010.

Each quantum registry sequence may have an associated index. The index may indicate the location of the quantum registry sequence in a quantum registry. For example, an index may be a number (e.g., 1, 2, 3, etc.) indicating the order in which the quantum registry sequences were added to the quantum registry. Quantum registry 216 and quantum registry 234 may have identical quantum registry sequences with identical indexes associated with the quantum registry sequences.

As shown by operation 322, each of the requesting device 100A and verifying device 110A includes means, such as a processor, memory, quantum entangled particle reader, or the like, for storing the quantum registry sequence in the quantum registry.

As shown by operation 323, each of the requesting device 100A and verifying device 110A includes means, such as a processor, memory, quantum entangled particle reader, or the like, for updating the status of one or more quantum registry sequences in the quantum registry. Following initial addition of a quantum registry sequence, operation 323 comprises changing the status of the quantum registry sequence to "unused." However, the status of a given quantum registry sequence may thereafter be updated. Each quantum registry sequence in a given quantum registry may have a status indicating if the quantum registry sequence is "unused," "in-use," or "used." An "unused" status may indicate that the quantum registry sequence has not been used for an authentication process and may be available for selection by requesting device 100A and verifying device 110A to use as part of an authentication request. An "in-use" status may indicate that the quantum registry sequence is currently being used for an authentication process and may not be available for selection by requesting device 100A and verifying device 110A for use as part of an authentication request. A "used" status may indicate that the quantum registry sequence has been used for an authentication process and may not be available for selection by requesting device 100A for use as part of an authentication request. When an "unused" quantum registry sequence is selected for use in an authentication process, the corresponding requesting device 100A or verifying device 110A may update the status of the quantum registry sequence to "in-use" or "used," as appropriate. Updating of a quantum registry may include any or all of operations 320-323.

The method may end following operation 322 when first establishing a quantum registry, or following operation 323 during use of the quantum registry. Specifically, the operations shown in FIG. 3D may occur at any time prior to, during, or after the operations shown in FIGS. 3A-3C to replenish and/or update the quantum registry.

Operations 320-322 may be repeated continuously, at regular intervals, and/or as needed to ensure a sufficient number of quantum registry sequences are available for use in authentication processes. Similarly, operation 323 may be repeated continuously, at regular intervals, and/or as needed to maintain identical quantum registries between two devices in a distributed system. Updating the quantum registry may include operations 320-323. In addition, updating the quantum registry may include notifying (via a transmission) any of requesting devices 100A-100N and/or verifying devices 100A-100N of status changes to the quantum registry (e.g., following a change of a status to "used") in order to maintain consistency between quantum registries. In a first example, quantum registries may be updated with new quantum registry sequences once per day. In a second example, quantum registries may be updated continuously by obtaining quantum entangled particles from quantum entangled particle generator 120 via quantum distribution medium 140. In a third example, quantum registries may be updated following each successful authentication request.

FIGS. 3A-3D illustrate operations performed by apparatuses, methods, and computer program products according to various embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Example System Operations

Figure 4A:
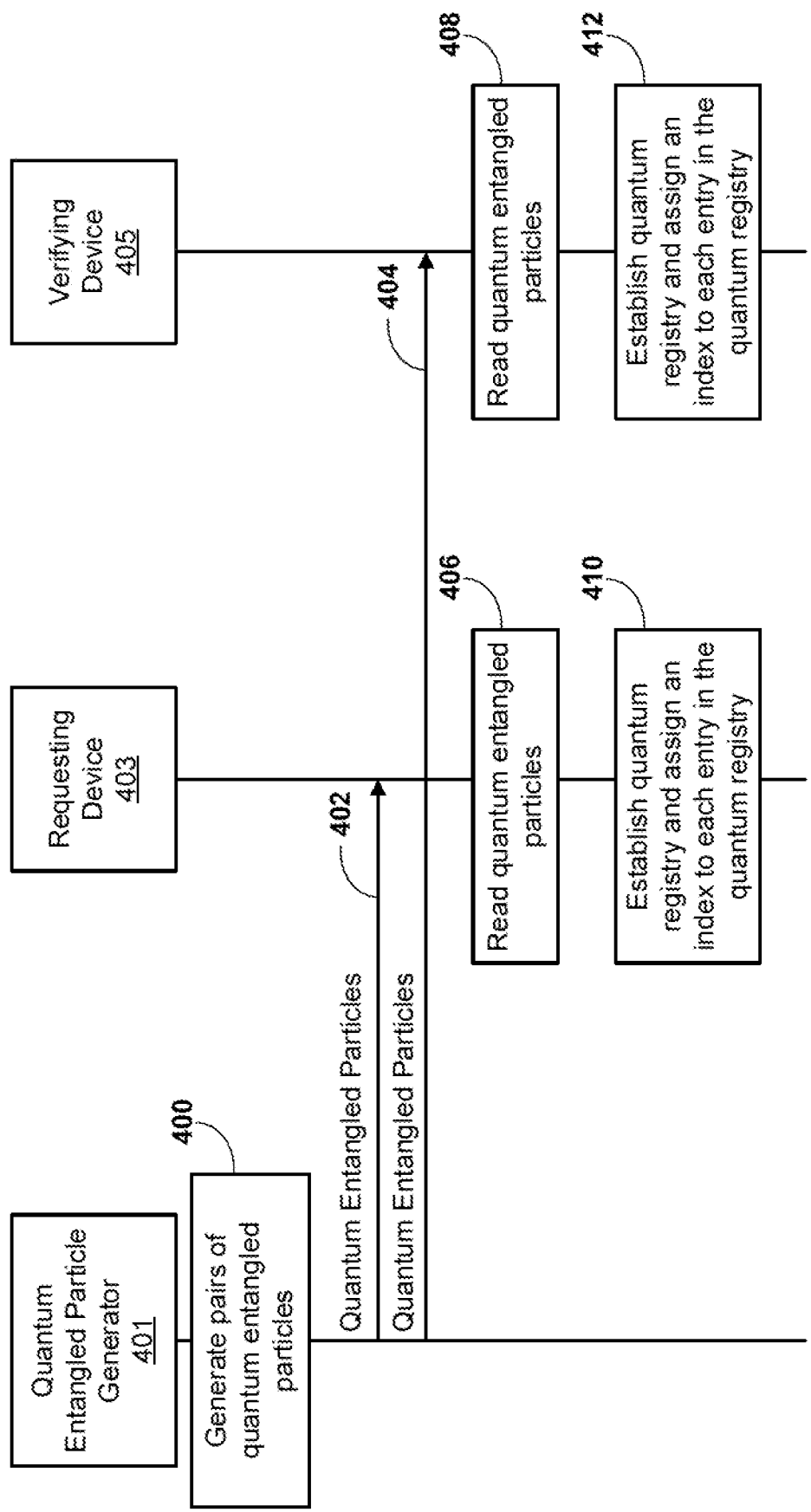
Figure 4B:
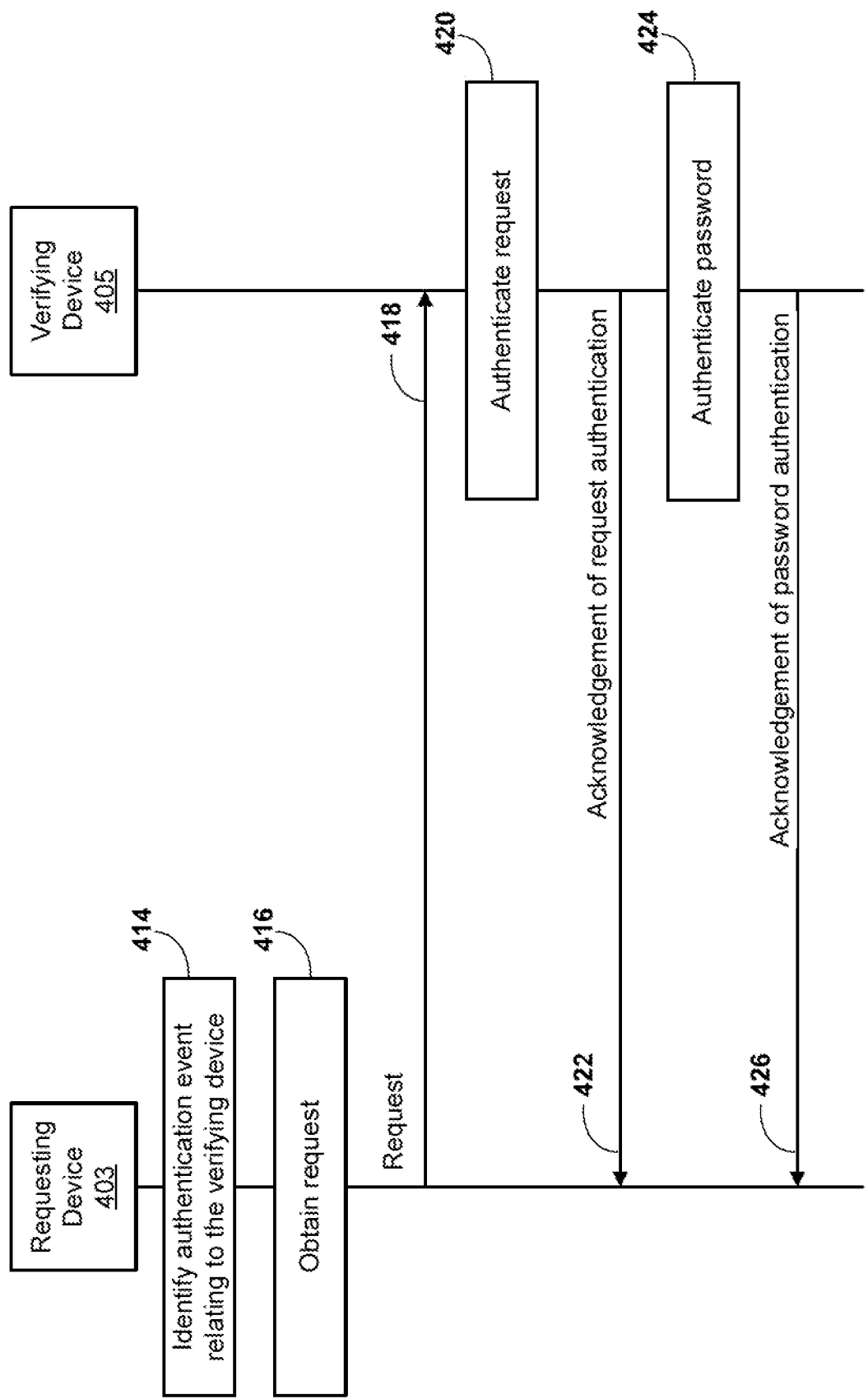

As noted above, requesting devices and verifying devices may facilitate authentication of devices and/or verification of the identity of users of the devices in a distributed system. FIGS. 4A-4C show diagrams illustrating example operations performed by components of a distributed system that may be performed when authenticating a device and/or verifying the identity of the user of a device. In these figures, operations performed by a quantum entangled particle generator are shown along the line extending from the box labeled "quantum entangled particle generator 401." Similarly, operations performed by a requesting device are shown along the line extending from the box labeled "requesting device 403" and operations performed by a verifying device are shown along the line extending from the box labeled "verifying device 405." Operations impacting two or more devices, such as data transmissions between the devices, are shown using arrows extending between these lines. Generally, the operations are ordered temporally with respect to one another. However, it will be appreciated that the operations may be performed in other orders from those illustrated herein.

Turning to FIG. 4A, at operation 400, a quantum entangled particle generator 401 generates pairs of quantum entangled particles. The quantum entangled particle generator 401 may generate pairs of quantum entangled particles continuously, at regular intervals (e.g., once a day, etc.), in response to a request from another device (e.g., a requesting or verifying device) throughout a distributed system, and/or via other processes. Quantum entangled particles may be generated in order to provide a shared secret to the requesting device 403 and the verifying device 405, to facilitate authentication, and to secure communication of sensitive information between the two devices.

When generated, the quantum entangled particles may represent bit sequences unknown to the quantum entangled particle generator 401 (e.g., by refraining from measuring or otherwise characterizing the generated quantum entangled particles) and, therefore, the quantum entangled particles may be in an indeterminate state. At operations 402 and 404, quantum entangled particle generator 401 transmits quantum entangled particles to the requesting device 403 and the verifying device 405. The quantum entangled particles may be transmitted with an optical fiber or other transmission medium. The quantum entangled particle generator 401 may transmit one quantum entangled particle from each pair of quantum entangled particles to the requesting device 403 and the other quantum entangled particle from each pair of quantum entangled particles to the verifying device 405.

In order to obtain a shared secret from the quantum entangled particles, the requesting device 403 and verifying device 405 may "read" (e.g., interpret) the quantum entangled particles. At operations 406 and 408, the requesting device 403 and verifying device 405 "read" the quantum entangled particles. Reading the quantum entangled particles may collapse the entanglement and allow the requesting device 403 and the verifying device 405 to obtain identical bit sequences from the quantum entangled particles. By doing so, the requesting device 403 and verifying device 405 may obtain identical bit sequences without transmitting any bit sequences between the devices.

While not shown herein, the requesting device 403 and the verifying device 405 may perform processes (e.g., verification of entanglement via testing of Bell's inequality, or other verification processes) to identify whether any other entities are also measuring or characterizing the quantum entangled particles (e.g., such as a man in the middle attempting to listen in to the quantum entangled particles being distributed over a distribution medium). In this manner, these devices may verify that the bit sequences derived from the quantum entangled particles are shared secrets known only two these devices.

In order to utilize the bit sequences for authentication processes, the requesting device 403 and the verifying device 405 may agree on a method of categorizing the bit sequences obtained from the quantum entangled particles. At operations 410 and 412, the requesting device 403 and verifying device 405 establish quantum registries and assign an index to each entry in the quantum registries. The quantum registries may include the bit sequences (e.g., quantum registry sequences) obtained by "reading" the quantum entangled particles. Each quantum registry sequence in the quantum registries may be assigned an index, the index indicating the location of the quantum registry sequence in the quantum registry. For example, an index may be a number indicating the order in which a quantum registry sequence was added to the quantum registry. By doing so, the requesting device 403 and the verifying device 405 may utilize the index to indicate which entry in the quantum registry sequence may be selected for an authentication process, to establish a symmetric cryptographic key, etc. In addition, each entry in the quantum registry may be assigned a status, the status indicating if the quantum registry sequence is unused, in-use, or used. An unused quantum registry sequence may be available for selection by the requesting and verifying devices for use in an authentication process and/or other processes. An in-use quantum registry sequence may be currently in-use for an authentication (and/or other) process and may not be available for selection by the devices. A used status may indicate a quantum registry sequence that has been used for an authentication (and/or other) purpose and may not be available for selection by the devices.

Operations 400-412 may be repeated any number of times and may be performed continuously, at regular intervals, and/or in response to a request or event throughout the distributed system. Following initial generation, the quantum registries may be updated with additional information derived from subsequently obtained quantum entangled particles.

By establishing these registries, both the requesting device 403 and the verifying device 405 may have access to shared secrets to choose from over time, and the requesting and verifying devices may perform a multi-factor authentication process using, in part, these shared secrets. The multi-factor authentication process may utilize quantum registry sequences as a first factor. A second factor may be a user authentication factor (e.g., a password, a pin, a fingerprint (and/or other biometric factor), etc.). FIG. 4B shows operations that may be performed during an authentication process.

Turning to FIG. 4B, at operation 414, the requesting device 403 may identify an authentication event relating to the verifying device 405. For example, the requesting device 403 may be a banking client and the authentication event may be a user's desire to access financial information provided by a bank that utilizes the verifying device 405 to gate access to this sensitive information. In order to obtain access to the sensitive information desired by the user of the requesting device 403, the requesting device 403 may initiate the authentication process as described below.

At operation 416, the requesting device 403 obtains a request. The request may be initiated in order to allow the verifying device 405 to authenticate the requesting device 403. To do so, the requesting device 403 may first gather a set of request components. The request information may include a timestamp for the request, a user authentication factor (e.g., a password) associated with a user of the requesting device 403, an unused quantum registry sequence, and an index associated with the chosen quantum registry sequence. Once the unused quantum registry sequence is chosen for use in the authentication process, the requesting device 403 may change the status of the quantum registry sequence from unused to in-use. In some scenarios, the request may also include directions for secure communications in the event that the device authentication is successful. For example, the requesting device 403 may include directions for encrypting sensitive information using a symmetric cryptographic key, a second quantum registry sequence, etc.

Second, the requesting device 403 may perform a function (e.g., a cryptographic hash function) on the request information to obtain a request data item including an encoded set of request components. The set of request components may be encoded in order to protect the quantum registry sequence and user authentication factor from third-party interference. In addition, the requesting device 403 may encrypt the user authentication factor using an encryption method previously agreed upon by the requesting and verifying devices. The completed request may include the encrypted user authentication factor, the encoded set of request components, the timestamp associated with the request, and the index associated with the quantum registry sequence in the request data item. By doing so, the user authentication factor and the quantum registry sequence may be protected from interference from a third party. The timestamp and index may not require encryption and/or hashing, as the timestamp includes no shared secrets and the index is not usable by a third party without access to a quantum registry.

At operation 418, the requesting device 403 transmits the request to the verifying device 405 via a communications network.

At operation 420, the verifying device 405 authenticates the request. In order to authenticate the request, the verifying device 405 may attempt to recreate the request data item by generating a complementary request data item. The verifying device 405 may decrypt the user authentication factor (e.g., password) using the previously established encryption method and may use the index provided by the requesting device 403 to select the identical quantum registry sequence from the quantum registry hosted by the verifying device 405. By doing so, the verifying device 405 may obtain the complementary request data item including the index, the decrypted user authentication factor, the timestamp, and the quantum registry sequence. The verifying device 405 may perform a function (e.g., a cryptographic hash function) on the complementary request information to generate the complementary request data item.

The verifying device 405 may compare the request data item provided by the requesting device 403 to the complementary request data item to determine whether the requesting device 403 has access to an identical quantum registry (and, therefore identical quantum registry sequences). If the request data item matches the complementary request data item, the verifying device 405 may authenticate the request. If the request data item does not match the complementary request data item, the request for access may be denied. Denying the request for access may involve sending a denial notification to the requesting device 403 and the denial notification may include a warning that third-party interference may be detected.

For example, the request transmitted from the requesting device 403 to the verifying device 405 may include the following: <index 5, 2020 Oct. 20 11:04:32, fsj*#cbi@&b, C20F . . . 0379> where index 5 is the index associated with a quantum registry sequence, 2020 Oct. 20 11:04:32 is the timestamp of the request, fsj*#ebi@&b is the encrypted password, and C20F . . . 0379 is the request data item. The purpose of authenticating the request may be to determine if the requesting device 403 and the verifying device 405 have identical quantum registry sequences and, therefore, shared secrets. If the devices do not have matching quantum registry sequences, a third party may be masquerading as the requesting device 403 and/or a third party may be attempting to interfere in the communications between the requesting device 403 and the verifying device 405.

In order to authenticate the request, the verifying device 405 may obtain a complementary request data item (e.g., complementary hashed request components). In this example, the user authentication factor may be a password. First, the verifying device 405 may decrypt the encrypted password. Second, the verifying device 405 may utilize the index (e.g., index 5) provided by the requesting device 403 to retrieve a quantum registry sequence with an index of 5 from the quantum registry hosted by the verifying device 405. The verifying device 405 may perform a function (e.g., a cryptographic hash function) on the timestamp, index, decrypted password, and quantum registry sequence with an index of 5. The complementary request data item may be C20F . . . 0379 and the complementary request data item may match the request data item of C20F . . . 0379. Consequently, the requesting device 403 and the verifying device 405 may have matching quantum registry sequences with an index of 5 and, therefore, the verifying device 405 may authenticate the requesting device 403.

At operation 422, the verifying device 405 transmits an acknowledgement of the successful request authentication to the requesting device 403 via the communications network (in this example, the request is authenticated). However, the verifying device 405 may not allow transmission of sensitive information until the password has been authenticated as described below.

At operation 424, the verifying device 405 authenticates the password. The verifying device 405 may store a repository of, for example, hashed passwords in order to facilitate the authentication of user passwords. Therefore, the verifying device 405 may hash the decrypted password and compare the hashed decrypted password to the hashed password associated with the user initiating the request. If the hashed decrypted password matches the hashed password, the password (and, therefore the user) may be authenticated. If the hashed decrypted password does not match the hashed password, the request for access may be denied. Denying the request for access may involve sending a denial notification to the requesting device 403 and the denial notification may include a warning that third-party interference may be detected. At operation 426, the verifying device 405 transmits an acknowledgement of the successful password authentication to the requesting device 403 via the communications network. A successful password authentication may indicate that a secure connection and the transmission of sensitive information may be allowed by the verifying device 405. Prior to establishing a secure connection, the verifying device 405 may update the quantum registry as described in FIG. 4C. FIG. 4C shows operations that may be performed to update the quantum registry, establish a secure connection, and exchange sensitive information.

Turning to FIG. 4C, at operation 428, the verifying device 405 changes the status of the quantum registry sequence retrieved by the verifying device 405 at operation 420 to used. This status change may ensure that the verifying device 405 does not use the same quantum registry sequence for a second authentication process.

At operation 430, the verifying device 405 transmits an acknowledgement of status change to the requesting device 403. The acknowledgment may be sent in order to maintain updated quantum registries between the requesting and verifying devices. After obtaining this authentication acknowledgement, at operation 432 the requesting device 403 changes the status of the quantum registry sequence used in the request (e.g., operation 416) to "used."

At operation 434, a secure connection is established between the requesting device 403 and the verifying device 405. Establishing a secure connection may involve agreeing on a shared method for encrypting sensitive information. This shared method may be previously established, may be shared as part of the request for access, and/or may be established by one of the devices following operation 432. For example, the encryption method may include use of a symmetric cryptographic key based on an unused quantum registry sequence. In this example, the requesting device 403 may send an index associated with this unused quantum registry sequence with the request (e.g., operation 416). Alternatively, the requesting device 403 or verifying device 405 may send this index following the authentication of the password. In a second example, the encryption method may include use of a symmetric cryptographic key based on a portion of the original unused quantum registry sequence. In this second example, there may be an indication in the request (e.g., operation 416) that a certain section of the bit sequence in the quantum registry sequence should be used for authentication and a certain section of the bit sequence in the quantum registry sequence should be used for data encryption. Once this secure connection has been established, the requesting device 403 and verifying device 405 may exchange sensitive information as described below. The secure connection may be established via other methods (e.g., derivation of a session key using asymmetric encryption) without departing from embodiments disclosed herein.

At operation 436, the requesting device 403 and the verifying device 405 exchange sensitive information. The sensitive information may include, for example, financial information, future plans, personal information, and/or other types of data. In addition, the requesting device 403 and verifying device 405 may take advantage of the secure connection in order to ensure the quantum registries hosted by each device are identical. By sending the sensitive information via the secure connection after authentication, the sensitive information may be less likely to be distributed to unintended recipients.

At operation 438, the requesting device 403 and the verifying device 405 update their quantum registries. Updating their quantum registries may include obtaining, from the quantum entangled particle generator 401, quantum entangled particles, reading the quantum entangled particles to obtain quantum registry sequences, storing the quantum registry sequences in their quantum registries, assigning an index to each quantum registry sequence, and updating the status of each new quantum registry sequence to unused. Quantum registries may also be updated at other times and/or for other reasons, such as to change the status of one or more quantum registry sequence to "in-use" or "used." Quantum registries may be updated at other times and/or for other reasons without departing from embodiments disclosed herein. The quantum registries may also be updated by, for example, exchanging bit sequences via the secure connection. While not derived directly from quantum entangled particles, these sequences may still be added to the quantum registries and used similarly. These sequences may be marked so that such sequences are distinguishable from those obtained using quantum entangled particles, hereby allowing for discrimination in the selection and use of sequences in the quantum registries.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also described as may be set forth in some of the appended claims. Although specific terms are employed herein, they are used in a generic and descriptive sense only and not for purposes of limitation.

What is claimed is:

1. A method for authentication between a requesting device and a verifying device, the method comprising:
   receiving, by communication hardware of the requesting device, a user authentication factor for a user initiating a request;
   generating, by a transformation engine of the requesting device, a request data item using a function operating on a set of request components, the set of request components comprising (i) a quantum registry sequence obtained via a quantum distribution medium and with one or more quantum entangled particles distributed to the requesting device thereby, (ii) an index that references the quantum registry sequence in a quantum registry, (iii) a timestamp for the request, and (iv) the user authentication factor for the user initiating the request;
   encrypting, by encryption circuitry of the requesting device, the user authentication factor to produce an encrypted user authentication factor;
   obtaining the request by request generation circuitry of the requesting device, the request comprising the encrypted user authentication factor, the timestamp, the index, and the request data item;
   transmitting, by the communication hardware and via a communications network, the request to the verifying device;
   obtaining, by the communication hardware, an authentication acknowledgement from the verifying device, the authentication acknowledgement indicating that the verifying device has determined that the quantum registry sequence matches a copy of the quantum registry sequence obtained by the verifying device via the quantum distribution medium; and
   obtaining, by the communication hardware, a second authentication acknowledgement from the verifying device, the second authentication acknowledgement indicating that the verifying device has verified, based on the encrypted user authentication factor in the request, that the user initiated the request.

2. The method of claim 1, further comprising:
   prior to obtaining the request data item:
      obtaining, by the communication hardware of the requesting device and via the quantum distribution medium, the one or more quantum entangled particles from a quantum entangled particle generator;

obtaining, by a quantum entangled particle reader of the requesting device, the quantum registry sequence, the quantum registry sequence being a bit sequence; and storing, by the quantum entangled particle reader, the quantum registry sequence in the quantum registry, the quantum registry comprising:
one or more quantum registry sequences,
a respective index for each quantum registry sequence of the one or more quantum registry sequences, and
a status for each of the one or more quantum registry sequences.

3. The method of claim 2, wherein the status for each of the one or more quantum registry sequences is unused, in-use, or used.

4. The method of claim 1, wherein obtaining the request data item comprises:
identifying a set of quantum registry sequences from the quantum registry that each have a status of being unused; and
selecting the quantum registry sequence from the set of quantum registry sequences.

5. The method of claim 4, further comprising:
after selecting the quantum registry sequence, updating, by the request generation circuitry and to obtain an updated status, the status of the quantum registry sequence to in-use, wherein an in-use status indicates that the quantum registry sequence is:
not available for selection by the requesting device, and
in-use for an authentication process.

6. The method of claim 5, further comprising:
after obtaining the second authentication acknowledgement, modifying, by the request generation circuitry, the updated status of the quantum registry sequence to used, wherein a used status indicates that the quantum registry sequence is:
not available for selection by the requesting device, and
not usable for any authentication processes.

7. The method of claim 6, further comprising:
updating, by the request generation circuitry, the quantum registry, wherein updating the quantum registry comprises:
obtaining one or more new quantum registry sequences via the quantum distribution medium, and
storing the one or more new quantum registry sequences in the quantum registry.

8. The method of claim 1, wherein the encrypted user authentication factor is encrypted using either an encryption method previously agreed upon by the requesting device and the verifying device or an encryption method identified by the requesting device in the request to the verifying device.

9. The method of claim 1, further comprising:
distributing, by the communication hardware, a copy of an encoded user authentication factor to the verifying device, the encrypted user authentication factor being usable in conjunction with the encoded user authentication factor to verify that the user initiated the request.

10. The method of claim 1, further comprising:
establishing, by the communication hardware, a secure communication channel between the requesting device and the verifying device using a second quantum registry sequence of the quantum registry; and
receiving, by the communication hardware and from the verifying device, sensitive information via the secure communication channel, wherein the sensitive information is responsive to the request.

11. A requesting device, the requesting device comprising:
communication hardware configured to receive a user authentication factor for a user initiating the request;
a transformation engine configured to generate an request data item using a function operating on a set of request components, the set of request components comprising (i) a quantum registry sequence obtained via a quantum distribution medium and with one or more quantum entangled particles distributed to the requesting device thereby, (ii) an index that references the quantum registry sequence in a quantum registry, (iii) a timestamp for a request, and (iv) a user authentication factor for a user initiating the request;
encryption circuitry configured to encrypt the user authentication factor to produce an encrypted user authentication factor;
request generation circuitry configured to obtain the request, the request comprising the encrypted user authentication factor, the timestamp, the index, and the request data item;
communication hardware further configured to:
transmit the request to a verifying device via a communications network, and
obtain an authentication acknowledgement from the verifying device, the authentication acknowledgement indicating that the verifying device has determined that the quantum registry sequence matches a copy of the quantum registry sequence obtained by the verifying device via the quantum distribution medium; and
the communication hardware being further configured to obtain a second authentication acknowledgement from the verifying device, the second authentication acknowledgement indicating that the verifying device has verified, based on the encrypted user authentication factor in the request, that the user initiated the request.

12. The requesting device of claim 11, wherein,
the communication hardware is further configured to obtain, prior to obtaining request data item and via the quantum distribution medium, the one or more quantum entangled particles from a quantum entangled particle generator, and
wherein the requesting device further comprises:
a quantum entangled particle reader configured to:
obtain the quantum registry sequence, the quantum registry sequence being a bit sequence; and
store the quantum registry sequence in the quantum registry, the quantum registry comprising:
one or more quantum registry sequences,
a respective index for each quantum registry sequence of the one or more quantum registry sequences, and
a status for each of the one or more quantum registry sequences.

13. The requesting device of claim 12, wherein the status for each of the one or more quantum registry sequences is unused, in-use, or used.

14. The requesting device of claim 11, wherein obtaining request data item comprises:
identifying a set of quantum registry sequences from the quantum registry that each have a status of being unused; and
selecting the quantum registry sequence from the set of quantum registry sequences.

15. The requesting device of claim 14, wherein,
the request generation circuitry is further configured to update, after selecting the quantum registry sequence and to obtain an updated status, the status of the quantum registry sequence to in-use, wherein an in-use status indicates that the quantum registry sequence is:
not available for selection by the requesting device, and
in-use for an authentication process.

16. The requesting device of claim 15, wherein,
the request generation circuitry is further configured to modify, after obtaining the second authentication acknowledgement, the updated status of the quantum registry sequence to used, wherein a used status indicates that the quantum registry sequence is:
not available for selection by the requesting device, and
not usable for any authentication processes.

17. The requesting device of claim 16, wherein,
the request generation circuitry is further configured to update the quantum registry wherein updating the quantum registry comprises:
obtaining one or more new quantum registry sequences via the quantum distribution medium, and
storing the one or more new quantum registry sequences in the quantum registry.

18. The requesting device of claim 11, wherein the encrypted user authentication factor is encrypted using either an encryption method previously agreed upon by the requesting device and the verifying device or an encryption method identified by the requesting device in the request to the verifying device.

19. The requesting device of claim 11, wherein,
the communication hardware is further configured to distribute a copy of an encoded user authentication factor to the verifying device, the encrypted user authentication factor being usable in conjunction with the encoded user authentication factor to verify that the user initiated the request.

20. The requesting device of claim 11, wherein,
the communication hardware is further configured to establish a secure communication channel between the requesting device and the verifying device using a second quantum registry sequence of the quantum registry; and
wherein the communication hardware is further configured to receive sensitive information via the secure communication channel,
wherein the sensitive information is responsive to the request.

* * * * *